(12) United States Patent
Harumoto et al.

(10) Patent No.: US 7,617,030 B2
(45) Date of Patent: Nov. 10, 2009

(54) DISPLAY SYSTEM, IN-VEHICLE DISPLAY SYSTEM, OPERATION CONTROL SYSTEM, AND OPERATOR SPECIFICATION METHOD

(75) Inventors: Satoshi Harumoto, Hyogo (JP); Masahiro Ikeda, Hyogo (JP); Guosheng Lin, Hyogo (JP); Hidenori Kurose, Hyogo (JP); Yuki Makimoto, Hyogo (JP); Shougo Tanaka, Hyogo (JP); Shinya Tanaka, Hyogo (JP); Kenji Nakata, Hyogo (JP); Takako Fukuda, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 166 days.

(21) Appl. No.: 11/987,263

(22) Filed: Nov. 28, 2007

(65) Prior Publication Data

US 2008/0133085 A1    Jun. 5, 2008

(30) Foreign Application Priority Data

Dec. 4, 2006 (JP) .............................. 2006-327582
Feb. 20, 2007 (JP) .............................. 2007-040083
Jun. 13, 2007 (JP) .............................. 2007-156803

(51) Int. Cl.
G06F 7/00 (2006.01)

(52) U.S. Cl. ............................. 701/36; 701/45; 701/49; 180/272; 180/273; 280/735

(58) Field of Classification Search .................. 701/33, 701/34, 36, 45, 49; 180/271, 272, 273, 268; 280/734, 735
See application file for complete search history.

(56) References Cited

U.S. PATENT DOCUMENTS

| 5,109,945 | A | * | 5/1992 | Koga ........................... 180/273 |
| 6,485,081 | B1 | * | 11/2002 | Bingle et al. .................. 296/76 |
| 6,777,922 | B2 | | 8/2004 | Tajima et al. |
| 2006/0028453 | A1 | | 2/2006 | Kawabe |

FOREIGN PATENT DOCUMENTS

| JP | A 63-067016 | 3/1988 |
| JP | A 2002-314958 | 10/2002 |
| JP | A-2002-341958 | 11/2002 |
| JP | A 2003-072520 | 3/2003 |
| JP | A 2003-108303 | 4/2003 |
| JP | A 2003-131799 | 5/2003 |
| JP | A 2005-104351 | 4/2005 |
| JP | A 2005-178471 | 7/2005 |
| JP | A 2005-200843 | 7/2005 |
| JP | A 2006-47534 | 2/2006 |
| JP | A 2006-193140 | 7/2006 |
| JP | A 2007-106372 | 4/2007 |

* cited by examiner

*Primary Examiner*—Gertrude Arthur Jeanglaud
(74) *Attorney, Agent, or Firm*—Oliff & Berridge, PLC

(57) ABSTRACT

A seat sensor is arranged for each of a plurality of seats. A pulse-signal supplying unit supplies a pulse signal with a different timing to the seat sensor. An operator identifying unit detects, when a first operator sit on any one of the seats operates an operating unit, the pulse signal supplied to the seat sensor by the pulse-signal supplying unit through the first operator and the operating unit, and identifies the first operator based on a timing of a detected pulse signal. An operation control unit performs a control depending on an operation performed on the operating unit by a detected first operator.

17 Claims, 24 Drawing Sheets

FIG.11

| | CONDITION | OPERATOR |
|---|---|---|
| 1 | NUMBER OF TIMES OF DETECTING SIGNALS INDICATIVE OF DRIVER≧8 | DRIVER |
| 2 | NUMBER OF TIMES OF DETECTING SIGNALS INDICATIVE OF PASSENGER≧8 | PASSENGER |
| 3 | NUMBER OF TIMES OF DETECTING SIGNALS INDICATIVE OF DRIVER AND PASSENGER<8 | NO OPERATOR |

FIG.12

| | CONDITION | OPERATOR |
|---|---|---|
| 1 | NUMBER OF TIMES OF DETECTING SIGNALS INDICATIVE OF DRIVER≧8 | DRIVER |
| 2 | NUMBER OF TIMES OF DETECTING SIGNALS INDICATIVE OF PASSENGER≧8 | PASSENGER |
| 3 | NUMBER OF TIMES OF DETECTING SIGNALS INDICATIVE OF DRIVER AND PASSENGER>NUMBER OF TIMES OF DETECTING SIGNALS INDICATIVE OF NO OPERATOR | |
| | WHEN PRIORITIZING OPERATION OF DRIVER | |
| 3-1 | TOTAL NUMBER OF TIMES OF DETECTING SIGNALS INDICATIVE OF DRIVER AND INDICATIVE OF DRIVER AND PASSENGER≧10 | DRIVER |
| 3-2 | TOTAL NUMBER OF TIMES OF DETECTING SIGNALS INDICATIVE OF DRIVER AND INDICATIVE OF DRIVER AND PASSENGER<10 | NO OPERATOR |
| | WHEN PRIORITIZING OPERATION OF PASSENGER | |
| 3-3 | TOTAL NUMBER OF TIMES OF DETECTING SIGNALS INDICATIVE OF DRIVER AND INDICATIVE OF DRIVER AND PASSENGER≧10 | PASSENGER |
| 3-4 | TOTAL NUMBER OF TIMES OF DETECTING SIGNALS INDICATIVE OF DRIVER AND INDICATIVE OF DRIVER AND PASSENGER<10 | NO OPERATOR |
| 4 | NUMBER OF TIMES OF DETECTING SIGNALS INDICATIVE OF DRIVER AND PASSENGER<NUMBER OF TIMES OF DETECTING SIGNALS INDICATIVE OF NO OPERATOR | NO OPERATOR |

FIG.13

| | CONDITION | OPERATOR |
|---|---|---|
| 1 | NUMBER OF TIMES OF DETECTING SIGNALS INDICATIVE OF DRIVER IS LARGEST | DRIVER |
| 2 | NUMBER OF TIMES OF DETECTING SIGNALS INDICATIVE OF PASSENGER IS LARGEST | PASSENGER |
| 3 | NUMBER OF TIMES OF DETECTING SIGNALS INDICATIVE OF DRIVER AND PASSENGER IS LARGEST | |
| | WHEN PRIORITIZING OPERATION OF DRIVER | |
| 3-1 | TOTAL NUMBER OF TIMES OF DETECTING SIGNALS INDICATIVE OF DRIVER AND INDICATIVE OF DRIVER AND PASSENGER≧10 | DRIVER |
| 3-2 | TOTAL NUMBER OF TIMES OF DETECTING SIGNALS INDICATIVE OF DRIVER AND INDICATIVE OF DRIVER AND PASSENGER<10 | NO OPERATOR |
| | WHEN PRIORITIZING OPERATION OF PASSENGER | |
| 3-3 | TOTAL NUMBER OF TIMES OF DETECTING SIGNALS INDICATIVE OF DRIVER AND INDICATIVE OF DRIVER AND PASSENGER≧10 | PASSENGER |
| 3-4 | TOTAL NUMBER OF TIMES OF DETECTING SIGNALS INDICATIVE OF DRIVER AND INDICATIVE OF DRIVER AND PASSENGER<10 | NO OPERATOR |
| 4 | NUMBER OF TIMES OF DETECTING SIGNALS INDICATIVE OF NO OPERATOR IS LARGEST | |
| | MOST DETECTED SIGNALS FROM AMONG SIGNALS INDICATIVE OF DRIVER, INDIVATIVE OF PASSENGER, AND INDICATIVE OF DRIVER AND PASSENGER IS CONSIDERED TO BE DETERMINATION RESULT | |
| 4-1 | NUMBER OF TIMES OF DETECTING SIGNALS INDICATIVE OF DRIVER IS LARGEST | DRIVER |
| 4-2 | NUMBER OF TIMES OF DETECTING SIGNALS INDICATIVE OF PASSENGER IS LARGEST | PASSENGER |
| 4-3 | NUMBER OF TIMES OF DETECTING SIGNALS INDICATIVE OF DRIVER AND PASSENGER IS LARGEST | |
| | WHEN PRIORITIZING OPERATION OF DRIVER | |
| 4-3-1 | TOTAL NUMBER OF TIMES OF DETECTING SIGNALS INDICATIVE OF DRIVER AND INDICATIVE OF DRIVER AND PASSENGER≧10 | DRIVER |
| 4-3-2 | TOTAL NUMBER OF TIMES OF DETECTING SIGNALS INDICATIVE OF DRIVER AND INDICATIVE OF DRIVER AND PASSENGER<10 | NO OPERATOR |
| | WHEN PRIORITIZING OPERATION OF PASSENGER | |
| 4-3-3 | TOTAL NUMBER OF TIMES OF DETECTING SIGNALS INDICATIVE OF DRIVER AND INDICATIVE OF DRIVER AND PASSENGER≧10 | PASSENGER |
| 4-3-4 | TOTAL NUMBER OF TIMES OF DETECTING SIGNALS INDICATIVE OF DRIVER AND INDICATIVE OF DRIVER AND PASSENGER<10 | NO OPERATOR |

FIG.28

| DRIVE OPERATION | | SHIFT LEVER OPERATION |
| | | PARKING BREAK OPERATION |
| | | HONKER OPERATION |
| | | INDICATOR OPERATION |
| | | LIGHTING SYSTEM OPERATION |
| | | WIPER OPERATION |
| | | DEFOGGER OPERATION |
| | | ETC RELATED OPERATION |
| | | ⋮ |
| VEHICLE BODY EQUIPMENT | CENTRAL CONTROL | CENTRAL DOOR LOCK |
| | | CENTRAL WINDOW LOCK |
| | | CHILD LOCK |
| | | ⋮ |
| | INDIVIDUAL CONTROL | AIR CONDITIONING OPERATION |
| | | SEAT POSITION CHANGE |
| | | SEAT HEATER CHANGE |
| | | WINDOW OPERATION |
| | | |

| | | OPERATOR IDENTIFICATION RESULT | | |
| | | DRIVER | PASSENGER | UNIDENTIFIED |
| --- | --- | --- | --- | --- |
| DRIVE OPERATION | | ○ | × | ○ |
| VEHICLE BODY EQUIPMENT | CENTRAL CONTROL | ○ | × | × |
| | INDIVIDUAL CONTROL | INDIVIDUAL | | (SHARED SWITCH) × |
| | | | | (INDIVIDUAL SWITCH) ○ |

FIG.30

|  | OPERATOR IDENTIFICATION RESULT | | |
|---|---|---|---|
|  | DRIVER | PASSENGER | UNIDENTIFIED |
| PROHIBITION NON-TARGET OPERATION | ○ | ○ | ○ |
| PROHIBITION TARGET OPERATION | × | ○ | × |

FIG.31
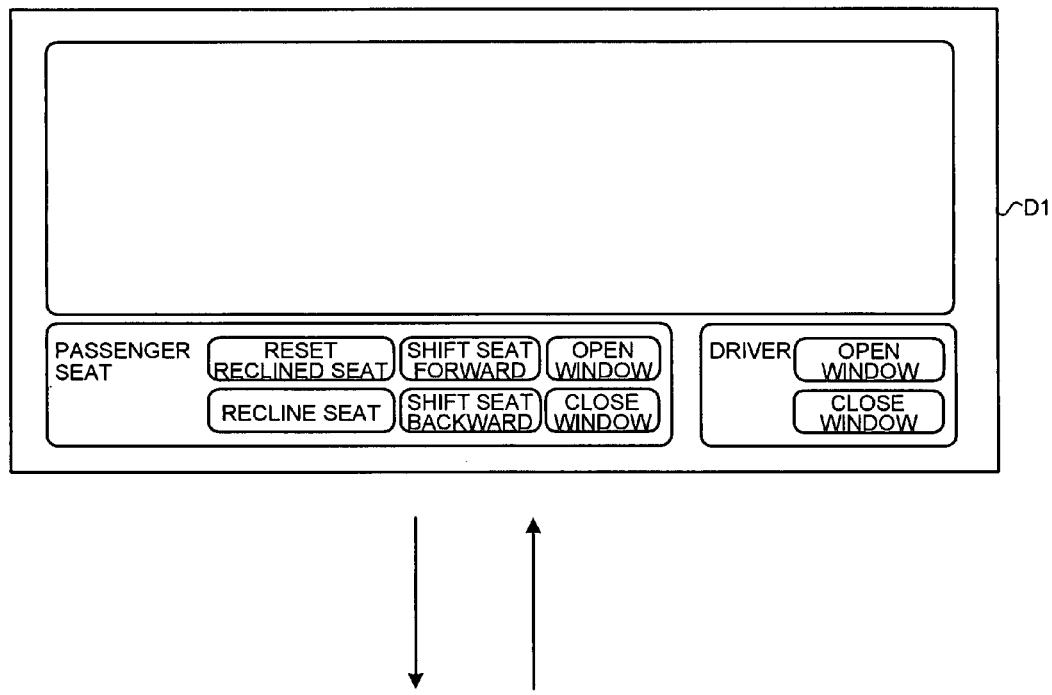
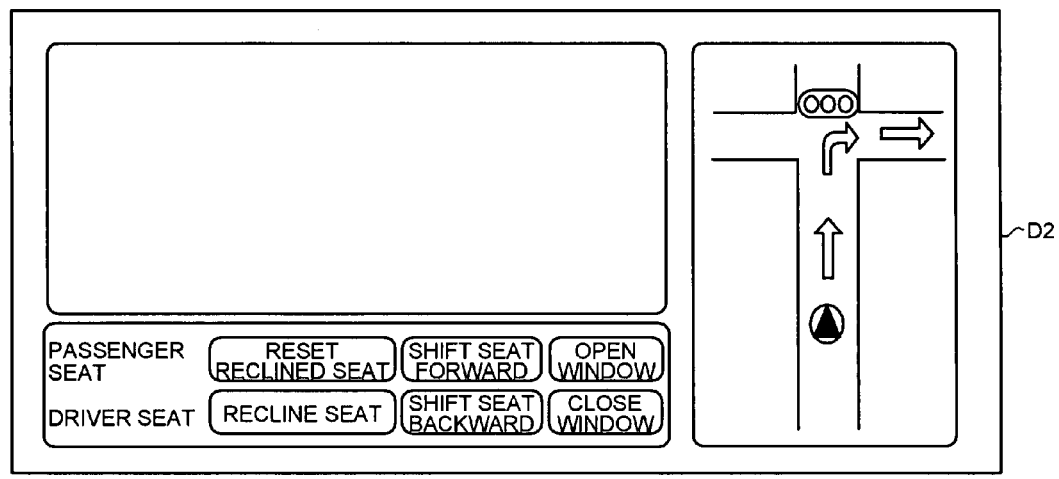

DISPLAY SYSTEM, IN-VEHICLE DISPLAY SYSTEM, OPERATION CONTROL SYSTEM, AND OPERATOR SPECIFICATION METHOD

BACKGROUND OF THE INVENTION

1. Field of the Invention

The present invention relates to a technology for identifying an operator who has operated an in-vehicle system.

2. Description of the Related Art

A car navigation system including a television service is generally equipped to a vehicle. Such a car navigation system has been developed from a conventional type, which has a single display screen that displays thereon either a car navigation data or a television program, to a new type, which has a dual-view liquid crystal display (LCD) that displays thereon different images for each of a driver seat and a passenger seat by using a touch panel or a remote controller.

Although the new type of the car navigation system can display different images and operation screens for each of a driver in a driver seat and a passenger in a passenger seat, an input unit (e.g., a touch panel) is shared by the driver and the passenger. Therefore, it is difficult for such a car navigation system to distinguish operators from one another for each of different images displayed on the dual-view LCD. For example, even when a passenger operates a touch panel to turn the volume up on a television, a car navigation system may erroneously determines that it has received an operation for changing a display type of the car navigation system from a driver in a driver seat. As a result, an operation different from that intended by the passenger may be erroneously performed.

For counteracting above problems, a conventional technology for distinguishing an operation by a driver from an operation by a passenger has been disclosed in Japanese Patent Application Laid-Open No. 2006-47534.

In the conventional technology, electric current having different frequencies are respectively supplied from respective power sources to a driver seat and a passenger seat, so that it is possible to distinguish an operation by a driver from an operation by a passenger by detecting supplied electric current from a touch panel and determining its frequency.

However, the conventional technology has a problem that frequency of electric current may be erroneously detected due to noise. Therefore, it is difficult to accurately identify an operator.

SUMMARY OF THE INVENTION

It is an object of the present invention to at least partially solve the problems in the conventional technology.

A display system according to one aspect of the present invention includes an operating unit including a touch panel; a seat sensor arranged for each of a plurality of seats; a pulse-signal supplying unit that supplies a pulse signal with a different timing to the seat sensor; an operator identifying unit that detects, when a first operator sit on any one of the seats operates the operating unit, the pulse signal supplied to the seat sensor by the pulse-signal supplying unit through the first operator and the operating unit, and identifies the first operator based on a timing of a detected pulse signal; and an operation control unit that performs a control depending on an operation performed on the operating unit by a detected first operator.

A method according to another aspect of the present invention is for identifying an operator who operates an operating unit including a touch panel and performing a control depending on an operation performed by an identified operator. The method includes supplying a pulse signal having unique timing to a seat sensor arranged for each of a plurality of seats; detecting, when a first operator sit on any one of the seats operates the operating unit, the pulse signal supplied at the supplying through the first operator and the operating unit; identifying the first operator based on a timing of a detected pulse signal; and performing a control depending on an operation performed on the operating unit by a detected first operator.

An in-vehicle display system according to still another aspect of the present invention includes an operating unit that includes a touch panel; a seat sensor arranged for each of a first seat and a second seat; a pulse-signal supplying unit that supplies a pulse signal with a different timing to the seat sensor; an operator identifying unit that detects, when a first operator from among a plurality of operators sit on the first seat and the second seat operates the operating unit, the pulse signal supplied to the seat sensor by the pulse-signal supplying unit through the first operator and the operating unit, and identifies the first operator based on a timing of a detected pulse signal; and an operation control unit that performs a control depending on an operation performed on the operating unit by a detected first operator.

An operation control system according to still another aspect of the present invention includes a seat sensor arranged for each of a first seat and a second seat; a pulse-signal supplying unit that supplies a pulse signal with a different timing to the seat sensor; an operating unit that receives an operation from an operator of a vehicle; an operator identifying unit that detects, when a first operator sit on either one of the first seat and the second seat operates the operating unit, the pulse signal supplied to the seat sensor by the pulse-signal supplying unit through the first operator and the operating unit, and identifies the first operator based on a timing of a detected pulse signal; and an operation control unit that performs a control depending on an operation performed on the operating unit by a detected first operator.

The above and other objects, features, advantages and technical and industrial significance of this invention will be better understood by reading the following detailed description of presently preferred embodiments of the invention, when considered in connection with the accompanying drawings

BRIEF DESCRIPTION OF THE DRAWINGS

FIGS. 11 to 13 are tables of examples of conditions for identifying an operator by using sampled pulse signals according to a third embodiment of the present invention;

FIG. 28 is a table of examples of driving operations and operations performed by using an in-vehicle equipment according to the eighth embodiment;

FIG. 29 is a table for explaining an input control performed depending on a identified operator according to the eighth embodiment;

FIG. 30 is a table for explaining release of a driving control depending on a identified operator according to the eighth embodiment; and FIG. 31 is a schematic diagram of exemplary display screens according to the eighth embodiment.

DETAILED DESCRIPTION OF THE PREFERRED EMBODIMENTS

Figure 1:
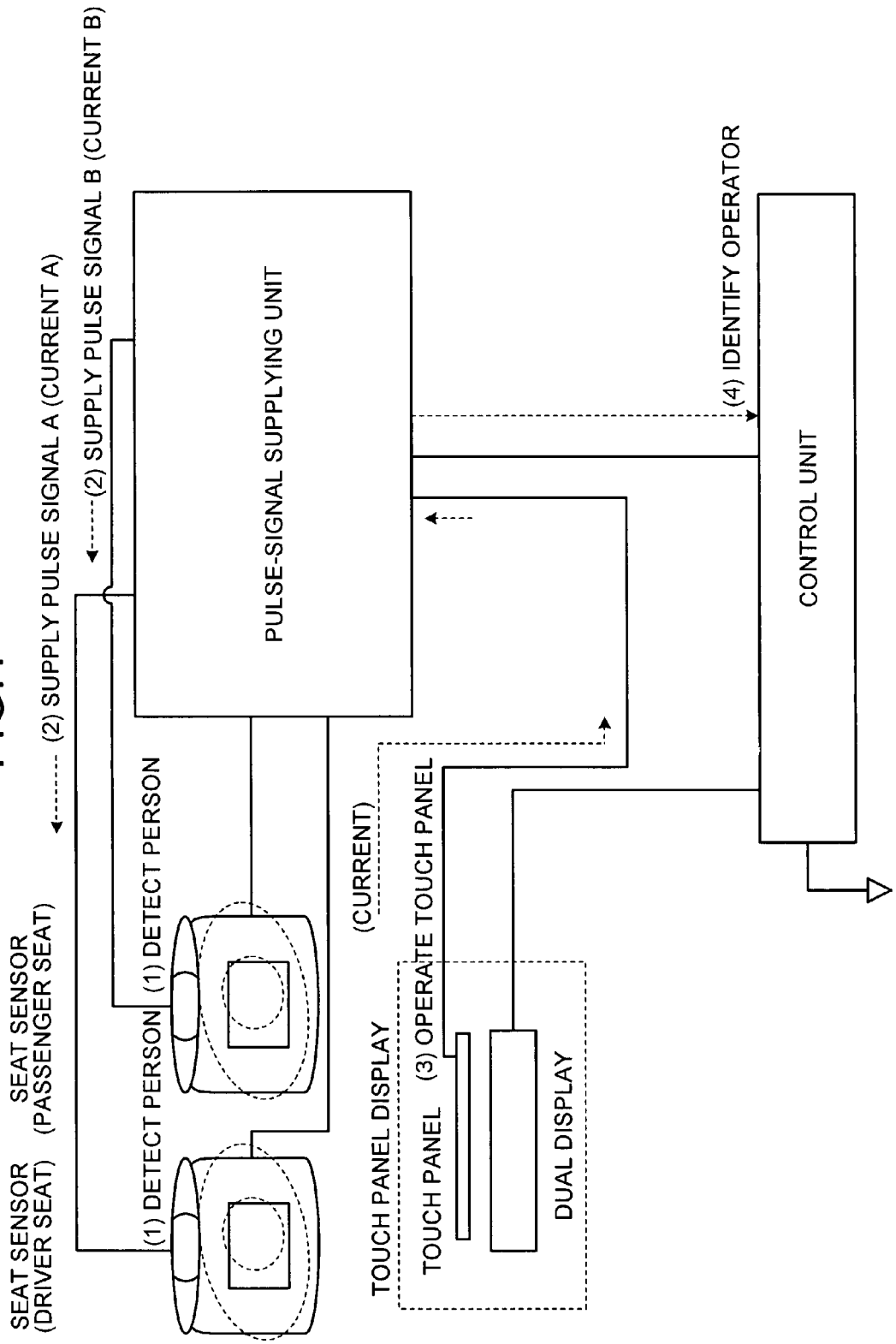
FIG. 1 is a schematic diagram of an in-vehicle system according to a first embodiment of the present invention.

Exemplary embodiments of the present invention are explained in detail below with reference to the accompanying drawings.

Main terms to be used in the document are described below. An "in-vehicle system", which corresponds to a "display system", a "method of identifying an operator", and an "in-vehicle display system" described in the appended claims, means a computer system, such as a car navigation system, equipped in a vehicle. Specifically, the in-vehicle system includes a liquid crystal display and the like that displays thereon a car navigation data and a television program, and receives various operations input from a touch panel, a remote controller, and the like. In such an in-vehicle system, e.g., a car navigation system, either a car navigation data or the television program is selectively displayed. When car navigation data is displayed on the liquid crystal display, the in-vehicle system receives an instruction of setting of destination or switching of a display type through a touch panel on the liquid crystal display, and executes an instructed operation. When a television program is displayed on the liquid crystal display, the in-vehicle system receives an instruction of switching of channel or volume adjustment through the touch panel, and executes an instructed operation. If the in-vehicle system includes a dual-view liquid crystal display, by which different images can be displayed on each of screens for a driver seat and a passenger seat, different images may be displayed on each of the screens. However, a touch panel and switches for performing operations are generally shared for each of the screens.

For decreasing load of a driver, assisting a comfortable driving, and entertaining passengers, a recent car navigation system (in-vehicle system) includes various functions that realize various services, e.g., replaying DVD (digital versatile disk) or connecting a digital camera, in addition to providing a television program and a car navigation system. Such a car navigation system that includes a dual-view liquid crystal display, by which different images can be displayed on screens for a driver seat and a passenger seat (including a back seat), is suitable for realizing a comfortable driving for a driver and passengers, because different services can be provided with respect to a driver and passengers. For operating the in-vehicle system, a remote controller has been conventionally used. However, a touch panel is increasingly used instead of a remote controller, thus decreasing load of a user. Although it is explained, in the embodiments, that an operation by a driver is distinguished from an operation by a passenger, the present invention is not thus limited. It is possible to distinguish operations by a driver, a passenger, and passengers in a back seat from one another. Furthermore, although it is explained that the present invention is realized by the in-vehicle system equipped in a vehicle, the present invention can be applied to other devices, e.g., televisions, where a dual-view liquid crystal display or a multi-view liquid crystal display is used.

FIG. 1 is a schematic diagram of an in-vehicle system according to a first embodiment of the present invention. As shown in FIG. 1, the in-vehicle system includes seat sensors equipped in a driver seat and a passenger seat. By supplying a pulse signal (e.g., electric current) to the seat sensors, the pulse signal is supplied to a driver and a passenger sitting in the driver seat and the passenger seat. The in-vehicle system includes a pulse-signal supplying unit that supplies a pulse signal, a control unit that performs various control, a touch panel that receives an instruction of an operation from a user, a dual display that displays thereon an image, and the seat sensors equipped in seats in which an operator sits.

The in-vehicle system in the above configuration is capable of accurately identifying an operator operating the touch panel.

Specifically, when each of the seat sensors detects that a person has sat in each corresponding seat, the in-vehicle system supplies pulse signals having different timings from the pulse-signal supplying unit to each corresponding person who has access to the touch panel (see (1) and (2) of FIG. 1).

For example, when the seat sensors in a driver seat and a passenger seat respectively detect that a driver and a passenger have sat on the driver seat and the passenger seat, the pulse-signal supplying unit supplies pulse signals (pulse signal A (electric current A) and pulse signal B (electric current B)) having different timings, e.g., different pulse periods, pulse widths, and pulse rise timings, to each of the seat sensors by using various methods, to supply electric current to the driver and the passenger who have access to the touch panel.

When a person touches the touch panel for an operation, the in-vehicle system detects, through a touch panel, a pulse signal that has been supplied to the person by the pulse-signal supplying unit, and identifies the person based on a timing of a detected pulse signal (see (3) and (4) of FIG. 1). Specifically, when a driver touches the touch panel for an operation, the pulse signal A (electric current A) that has been supplied to the seat sensor in a driver seat is supplied from the touch panel to the pulse-signal supplying unit through a body of the driver, so that the control unit of the in-vehicle system detects the pulse signal A (electric current A). The control unit determines that the driver is an operator who has operated the touch panel based on a timing of a detected pulse signal.

The in-vehicle system then executes an operation suitable for a determined operator. For example, assume that, when a driver operates the touch panel, the operation is for switching a display of a car navigation system, and when a passenger in a passenger seat operates the touch panel, the operation is for turning up volume on a television. When it is determined that the driver is an operator, the control unit executes an operation of switching a display of a car navigation system on a dual display. On the other hand, when it is determined that the passenger is an operator, the control unit executes an operation of turning up volume on the television.

The in-vehicle system according to the first embodiment can decrease noise, at minimum, to a pulse signal (e.g., electric current) supplied to an operator when detecting an operation performed by the operator from operations performed by other possible operators. As a result, it is possible to accurately identify the operator.

Figure 2:
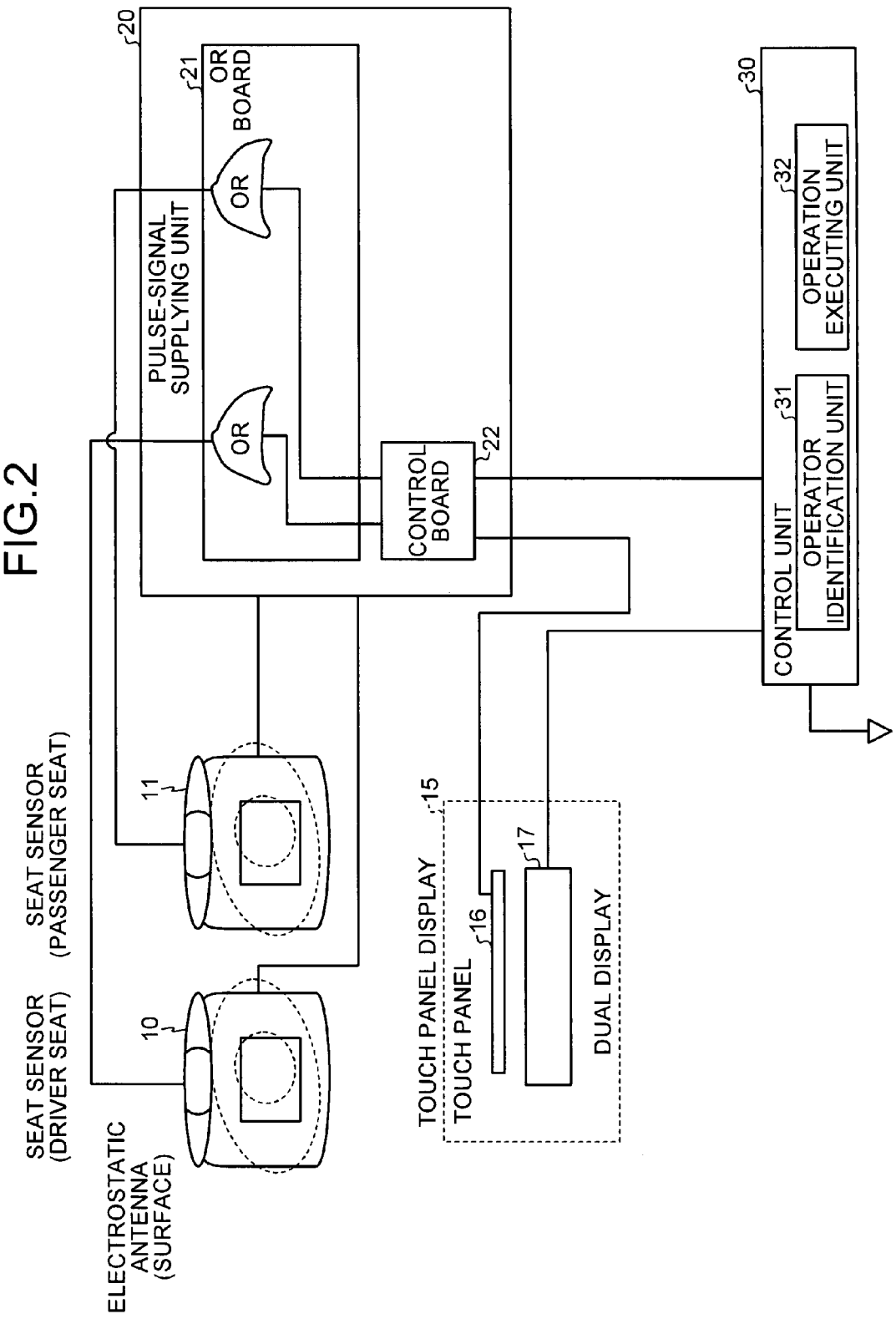
FIG. 2 is a block diagram of the in-vehicle system shown in FIG. 1.

FIG. 2 is a block diagram of the in-vehicle system shown in FIG. 1. As shown in FIG. 2, the in-vehicle system includes seat sensors 10 and 11, a touch panel display 15, a pulse-signal supplying unit 20, and a control unit 30.

The seat sensor 10 detects that a person (a driver) has sat in a driver seat, and supplies a pulse signal (electric current) received from the pulse-signal supplying unit 20 to the driver. Specifically, when a driver has sat in a driver seat, the seat sensor 10 sends a signal indicative of detection of the driver sat in the driver seat to the pulse-signal supplying unit 20. The pulse-signal supplying unit 20 then supplies a pulse signal A (electric current A) to the driver.

The seat sensor 11 detects that a person has sat in the passenger seat, and supplies a pulse signal (electric current) received from the pulse-signal supplying unit 20 to the person in the passenger seat. Specifically, similar to the seat sensor 10, when a passenger has sat in a passenger seat, the seat sensor 11 sends a signal indicative of detection of the passenger sat in the passenger seat to the pulse-signal supplying unit 20. The pulse-signal supplying unit 20 then supplies a pulse signal B (electric current B) to the passenger. Although it is explained, in the embodiments, that the seat sensors are equipped in a driver seat and a passenger seat, the seat sensor can be equipped in a back seat.

The touch panel display 15 includes a touch panel 16 and a dual display 17 in combination with each other, and displays various still images and moving images. The touch panel 16 is an input unit that receives various operations input from an operator. The touch panel display 15 corresponds to an operating unit described in the appended claims.

The touch panel 16 includes a matrix switch, a resistive switch, and the like. The touch panel 16 is an input unit that instructs a device, such as a car navigation system, to perform an operation when a corresponding portion displayed on the dual display 17 is pressed. The touch panel 16 receives a pulse signal (electric current) when a user operates the touch panel 16, and then outputs the pulse signal to the pulse-signal supplying unit 20. Specifically, upon receiving various operations from a driver in a driver seat, the touch panel 16 outputs contents of the operation (operation position of the touch panel 16) to the control unit 30, receives the pulse signal A (electric current A) supplied from the seat sensor 10 through a body of the driver, and outputs a signal with the pulse signal A (electric current A) superimposed, which indicates the operation position, to the pulse-signal supplying unit 20.

The pulse-signal supplying unit 20 includes an OR board 21 and a control board 22. The pulse-signal supplying unit 20 supplies pulse signals (electric current) having different timings for each of operators who operate the touch panel 16. The pulse-signal supplying unit 20 then detects electrical property of each of the operators from the pulse signal (electric current) that has been supplied to and detected from each of the operators, and adjusts a pulse signal (electric current) to be supplied to each of the operators depending on the detected electrical property. Thus, the control unit 30 can easily identify the operator. The pulse-signal supplying unit 20 corresponds to a pulse-signal supplying unit described in the appended claims.

Figure 3:
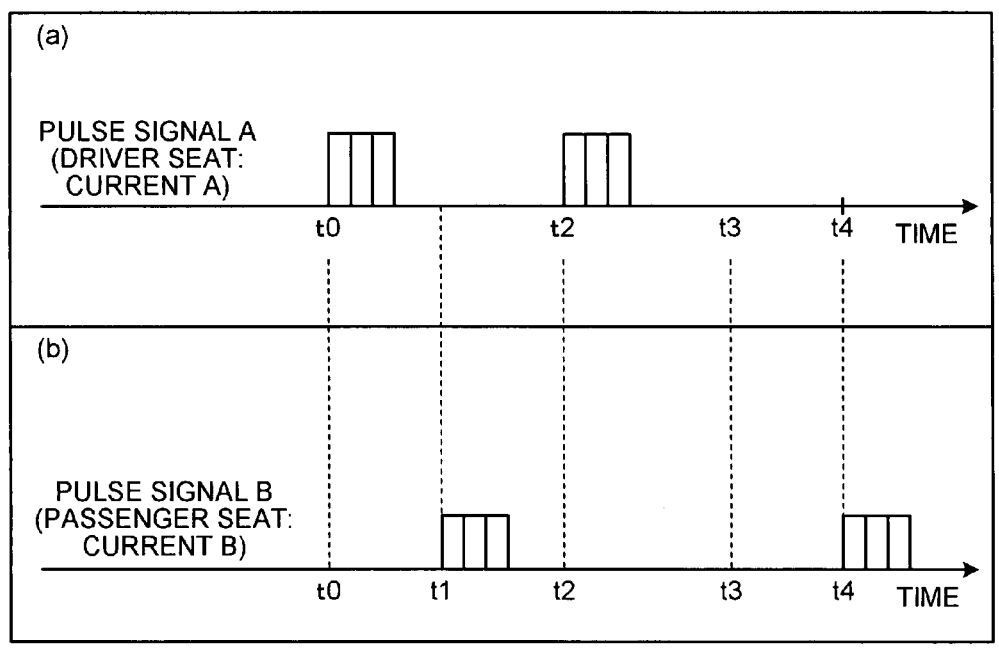
FIG. 3 is a schematic diagram for explaining pulse signals having different timings supplied by a pulse-signal supplying unit shown in FIG. 2.

FIGS. 3A and 3B are schematic diagrams for explaining pulse signals having different timings supplied by the pulse-signal supplying unit 20. Specifically, when the OR board 21 receives, from the seat sensors 10 and 11, signals indicating that a driver and a passenger, who have accesses to the touch panel, have sat in respective seats, the OR board 21 supplies a pulse signal A (electric current A) and a pulse signal B (electric current B), which have been converted from electric current output from the control unit 30 and have different rise timings, to a driver seat and a passenger seat as shown in FIGS. 3A and 3B. For example, the OR board 21 supplies the pulse signal A (electric current A) that rises at time t0 and t2 (see FIG. 3A), to the seat sensor 10 in a driver seat, and supplies the pulse signal B (electric current B) that rises at time t1 and t4 (see FIG. 3B) to the seat sensor 11 in a passenger seat. Although it is explained that pulse signals having different rise timings are supplied, it is possible to supply pulse signals having different pulse periods or pulse widths.

The control board 22 supplies current to each of the seat sensors 10 and 11 via the OR board 21; outputs a signal with the pulse signal (electric current), which indicates an operation position of the touch panel 16 and has been sent from the touch panel 16, to the control unit; detects electrical property of the operator from the pulse signal that has been supplied to and detected from the operator; and adjusts the pulse signal corresponding to electric current to be supplied to the operator depending on the detected electrical property. Thus, the control unit 30 can easily identify the operator. Specifically, upon receiving an operation from an operator in the driver seat through the touch panel 16, the control board 22 outputs the pulse signal A received through a body of the operator to the control unit 30.

Furthermore, upon receiving an operation from an operator in the driver seat, the control board 22 determines electrical property of the operator whether the operator easily conducts electricity based on the pulse signal supplied through a body of the operator. When it is determined that the operator easily conducts electricity, the control board 22 supplies the pulse signal A (electric current A) without adjusting the pulse signal A.

Figure 4:
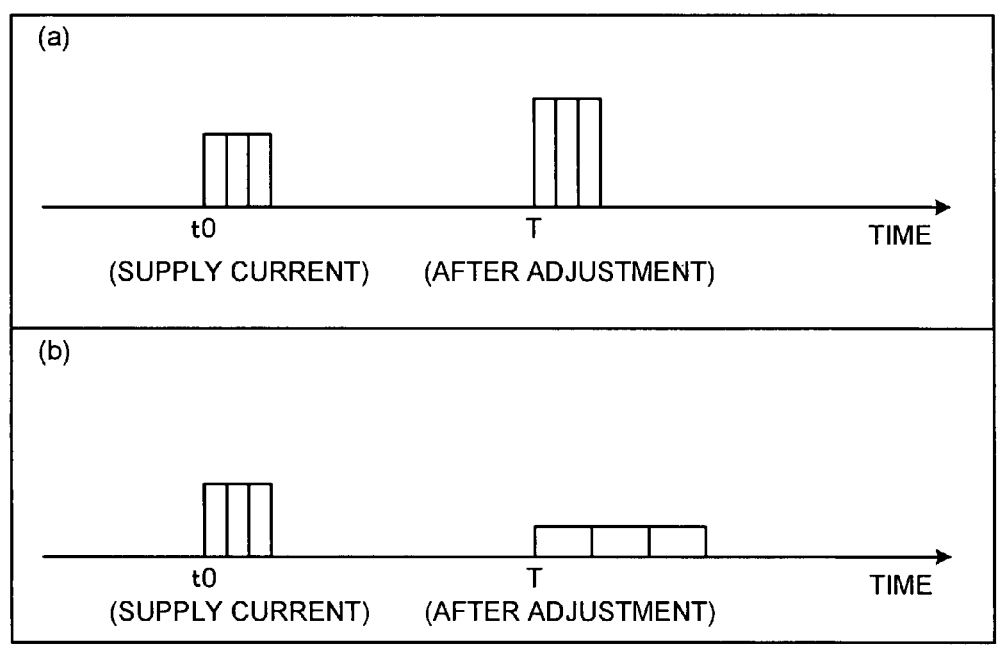
FIG. 4 is a schematic diagram of an example of adjustment of pulse signals according to the first embodiment.

On the other hand, when it is determined that the operator does not easily conduct electricity, the control board 22 adjusts the pulse signal to be supplied to the operator so that the pulse signal can be easily detected. As shown in FIG. 4, the control board 22 adjusts the pulse signal A (electric current A) to be supplied after time T at which the electrical property is determined. For example, the control board 22 increases a height of a pulse of the pulse signal A (electric current A) (see (a) shown in FIG. 4), or widens the pulse width (see (b) shown in FIG. 4) after the time T, so that the adjusted pulse signal has longer height of the pulse or wider pulse width than those at time t0 at a time of starting supplying the pulse signal. The control board 22 corresponds to an adjusting unit described in the appended claims.

The control unit 30 includes a built-in memory, an operator identifying unit 31, and an operation executing unit 32 to execute various processes. The built-in memory stores therein a control program for controlling operating system (OS), programs defining various process procedures, and necessary data.

When an operator operates the touch panel 16, the operator identifying unit 31 detects a pulse signal (electric current), which has been supplied from the pulse-signal supplying unit 20 to the operator, through the touch panel 16 and the control board 22, and identifies the operator based on a timing of a detected pulse signal (electric current). Specifically, when a driver in a driver seat operates the touch panel 16, the operator identifying unit 31 detects, through the control board 22, the pulse signal A (electric current A), which has been supplied from the pulse-signal supplying unit 20 to the driver, from a signal in which a signal indicative of the operation position and the pulse signal A (electric current A) are superimposed. Thus, the operator identifying unit 31 identifies that the driver is the operator based on the timing of the pulse signal A (electric current A). Furthermore, the operator identifying unit 31 outputs the signal indicative of contents of an operation performed by the identified operator to the operation executing unit 32. The operator identifying unit 31 corresponds to an operator identifying unit described in the appended claims.

When the operator is identified, the operation executing unit 32 executes an operation suitable for the operator, or outputs instruction for executing the operation to a corresponding device. Specifically, assume that an operation for turning up volume on a television and an operation for switching a display of a car navigation system are on the same operation position of the touch panel 16. When receiving, from the operator identifying unit 31, a signal indicating that an operation is performed by a person in a driver seat, the operation executing unit 32 executes switching of the display of the car navigation system or instructs a corresponding device to perform the operation. When receiving, from the operator identifying unit 31, a signal indicating that an operation is performed by a person in a passenger seat, the operation executing unit 32 executes turning on volume on a television or instructs a corresponding device to perform the operation. The operations of turning up volume on a television and switching display on the car navigation system are examples, and various operations, such as controlling air conditioner, can be similarly performed. The operation executing unit 32 corresponds to an operation executing unit described in the appended claims.

Figure 5:
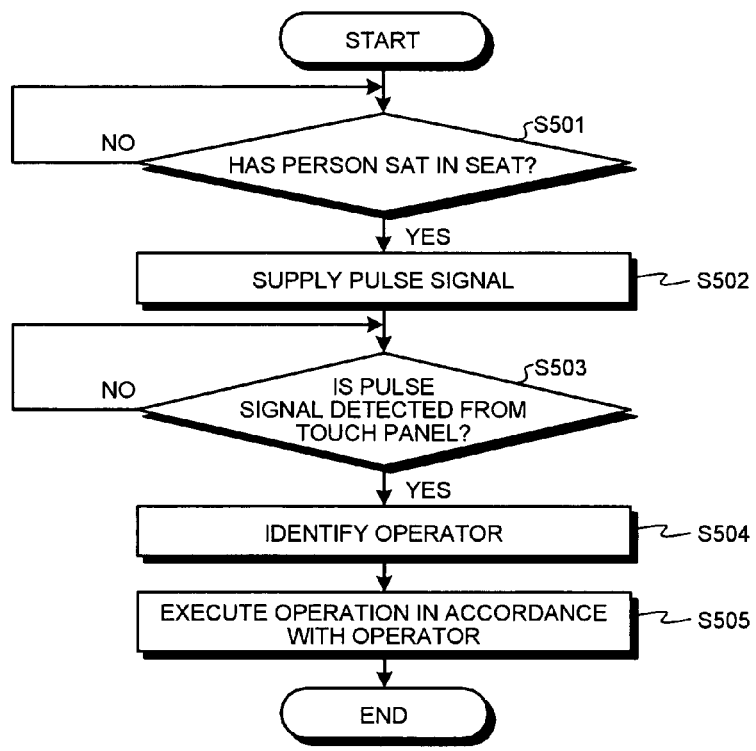
FIG. 5 is a flowchart of an operator identification process performed in the in-vehicle system shown in FIG. 1.

FIG. 5 is a flowchart of an operator identification process performed in the in-vehicle system shown in FIG. 1. As shown in FIG. 5, when the seat sensor 10 or 11 detects that a person has sat in a corresponding seat (Yes at step S501), the pulse-signal supplying unit 20 supplies a pulse signal (electric current) to the seat sensor 10 or 11 that has detected the person sat in the seat (step S502).

Specifically, when a driver and a passenger have sat in a driver seat and a passenger seat, respectively, the seat sensors 10 and 11 detect that the driver and the passenger have sat in the seats, and outputs respective signals indicating that the driver and the passenger have sat in the seats to the pulse-signal supplying unit 20. Upon receiving the signals, the pulse-signal supplying unit 20 supplies pulse signals (electric current A and B) having different timings to the seat sensors 10 and 11, respectively (see FIG. 3).

When the pulse signal is detected, through the control board 22, from a signal in which a signal indicative of the operation position of the touch panel 16 and the pulse signal (electric current) are superimposed (Yes at step S503), the operator identifying unit 31 identifies an operator based on a timing of a detected pulse signal (electric current) (step S504). The operation executing unit 32 executes the operation based on the signal indicative of the operation position, and an identified operator (step S505).

Specifically, assume that an operation for turning up volume on a television and an operation for switching a display of the car navigation system are arranged on the same operation position. Upon receiving an operation through the touch panel 16 from a driver in the driver seat, the operator identifying unit 31 detects the pulse signal from a signal, which indicates the operation position and in which the pulse signal (electric current) from the driver seat is superimposed. The operator identifying unit 31 then identifies the driver as the operator based on the timing of a detected pulse signal (electric current), and outputs a signal indicating that the driver is the operator and a signal indicative of the operation position to the operation executing unit 32. The operation executing unit 32 executes switching of a display of the car navigation system, or instructs a corresponding device to perform the operation.

On the other hand, when the operator identifying unit 31 determines that the operator is a person in the passenger seat, the operation executing unit 32 executes an operation of turning up volume on a television, or instructs a corresponding device to perform the operation.

Figure 6:
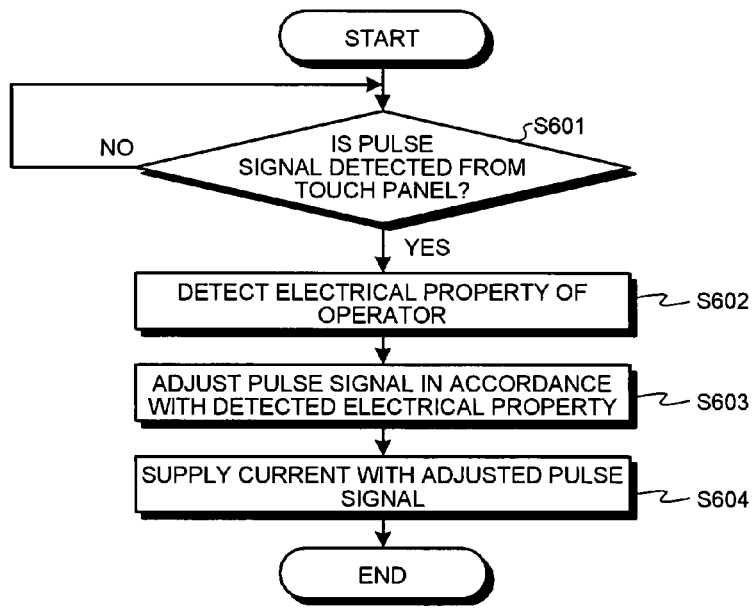
FIG. 6 is a flowchart of a pulse adjustment process performed in the in-vehicle system shown in FIG. 1.

FIG. 6 is a flowchart of a pulse adjustment process performed in the in-vehicle system shown in FIG. 1. As shown in FIG. 6, when the pulse signal (electric current) is detected, through the touch panel 16, from a signal in which a signal indicative of the operation position and the pulse signal are superimposed (Yes at step S601), the pulse-signal supplying unit 20 detects electrical property of an operator from the pulse signal that has been supplied through a body of the operator to the touch panel 16 and detected by the operator identifying unit 31 (step S602).

Specifically, when a driver operates the touch panel 16, the operator identifying unit 31 detects that the pulse signal (electric current) superimposed on a signal that indicates the operation position and received from the touch panel 16 via the control board 22 is the pulse signal A (electric current A). The operator identifying unit 31 then outputs a signal indicating that a detected pulse signal is the pulse signal A to the pulse-signal supplying unit 20. Upon receiving such a signal, the pulse-signal supplying unit 20 detects the electrical property of the operator, e.g., whether the operator (driver) does not easily conduct electricity, from the pulse signal A (electric current A).

The pulse-signal supplying unit 20 then adjusts a pulse of a pulse signal (electric current) to be supplied to the operator depending on detected electrical property of the operator (step S603), and supplies an adjusted pulse signal (electric current) to the seat sensor (step S604).

Specifically, when determining that an operator (driver) in the driver seat does not easily conduct electricity based on the pulse signal A (electric current A), the pulse-signal supplying unit 20 adjusts the pulse signal by widening pulse width or increasing height of pulse of the pulse signal (electric current) to be supplied to the operator, and supplies the adjusted pulse signal to the seat sensor 10.

As described above, according to the first embodiment, the touch panel 16 is arranged, pulse signals having different timings are supplied to operators who have access to the touch panel 16, an operator operating the touch panel 16 is identified, and a control is performed in accordance with an operation performed by a identified operator. When an operator performs an operation, a pulse signal that has been supplied to the operator is detected, and the operator is identified based on the timing of a detected pulse signal. Therefore, it is possible to suppress noise at minimum to the pulse signal (electric current) to be supplied to the operator. As a result, the operator can be accurately identified.

Furthermore, electrical property of the operator is detected from a detected pulse signal, and a pulse signal to be supplied to the operator is adjusted based on the detected electrical property. Therefore, it is possible to slightly adjust pulse width or pulse height of the pulse signal with respect to each operator. As a result, the operator can be accurately identified.

Specifically, it is possible to increase or decrease the pulse width or pulse height depending on electrical property of an operator, e.g., a person who easily conducts electricity or who does not easily conduct electricity. Therefore, each operator can be accurately identified.

According to the first embodiment, it is explained that, when the seat sensor detects that a person has sat in a corresponding seat, the pulse signal is supplied to the seat sensor that has detected the person in the seat. However, it is possible to supply the pulse signal to seat sensors when it is detected that a driver and a passenger have sat in the driver seat and the passenger seat because an operator needs to be identified in such a case.

Furthermore, it is explained that the present invention is applied to a dual display. However, the present invention can be applied to a case where a driver and a passenger view the same image. For example, it is possible to identify an operator and not to receive an operation performed by a driver during a driving.

Moreover, it is explained that a signal in which a signal indicative of the operation position and a pulse signal are superimposed is input to the control board, and such signal is output to the control unit. However, it is possible to separately input the signal indicative of the operation position and the pulse signal to the control board, and separately output such signals to the control unit. Furthermore, it is possible to input the signal indicative of the operation position directly to the control unit without passing the control board.

The pulse adjustment process can be continuously performed because electrical property of a person changes depending on an environment. It is possible to adjust the pulse signal at a start of activating the in-vehicle system by outputting a display that instructs an operator to touch the touch panel. Furthermore, the pulse-signal supplying unit detects electrical property of a person and adjusts the pulse signal in the pulse adjustment process. However, it is possible for the control unit to adjust a pulse signal by detecting such electrical property from the pulse signal received through the operator, and by adjusting electric current output from the control unit. Moreover, it is possible to adjust a pulse signal based on a prediction of a body shape of an operator.

It is explained in the first embodiment that a pulse signal (electric current) that has been supplied to the operator is detected from the touch panel. However, it is possible to detect the pulse signal from the hardware switch.

Figure 7:
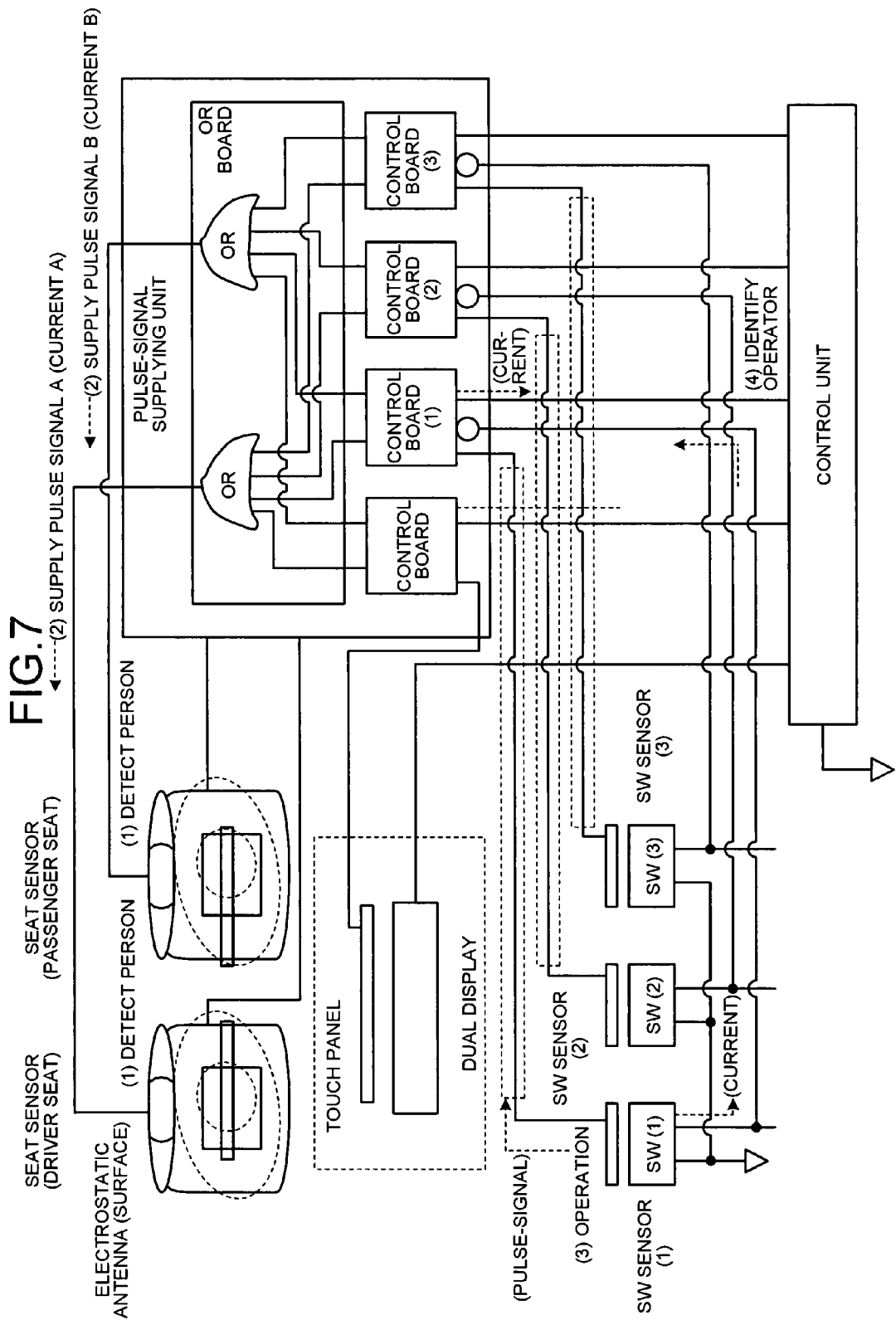
FIG. 7 is a schematic diagram of an in-vehicle system according to a second embodiment of the present invention.

It is explained below that a pulse signal (electric current) that has been supplied to the operator is detected from a hardware switch according to a second embodiment of the present invention. FIG. 7 is a schematic diagram of an in-vehicle system according to the second embodiment.

As shown in FIG. 7, similar to the first embodiment, the in-vehicle system according to the second embodiment includes seat sensors respectively equipped in a driver seat and a passenger seat, an OR board that supplies a pulse signal (electric current), a control board, a control unit that performs various control, a touch panel that receives an operation from an operator, and a dual display that displays thereon an image.

The in-vehicle system according to the second embodiment is different from that in the first embodiment in that it includes hardware switches (SW) 1 to 3, SW sensors 1 to 3 respectively equipped in the SWs 1 to 3, and control boards 1 to 3 respectively connected to the SWs 1 to 3 and SW sensors 1 to 3.

Specifically, the SWs 1 to 3 are input units that operate a car navigation system including a television. The SWs 1 to 3 are used as a power source of a car navigation system or for activating a television. When operated by an operator, the SWs 1 to 3 detect, through a body of the operator, a pulse signal (electric current) that has been supplied to the operator, and outputs the pulse signal (electric current) to the control boards 1 to 3, respectively.

The SW sensors 1 to 3 output a pulse signal (electric current) supplied to an operator who has operated the SWs 1 to 3 to the control boards 1 to 3 connected to the SW sensors 1 to 3, respectively.

The control boards 1 to 3 have same functions as that of the control board 22 described in the first embodiment. For example, the control boards 1 to 3 receive a pulse signal (electric current) from the SW sensors 1 to 3 through a body of an operator. Upon receiving an operation by a driver or a passenger in a driver seat and a passenger seat from the SWs sensors 1 to 3 or the SWs 1 to 3, the control boards 1 to 3 detect electrical property of the operator based on the pulse signal (electric current) supplied through the driver or the passenger, and adjusts the pulse signal to be supplied to a corresponding seat sensor depending on the electrical property. In the second embodiment, it is different from the first embodiment in that an ON/OFF signal of each of the SWs 1 to 3 is input separately form a pulse signal (electric current), and the pulse signal (electric current) is exclusively output to the control unit.

In the above configuration, when the seat sensor detects that people have sat in respective seats, a pulse-signal supplying unit in the in-vehicle system according to the second embodiment supplies pulse signals (electric current) having different timings to respective operators who have access to the SWs (see (1) and (2) of FIG. 7). Specifically, when seat sensors in a driver seat and a passenger seat respectively detects that people have sat in the driver seat and the passenger seat, the pulse-signal supplying unit supplies a pulse signal A (electric current A) and a pulse signal B (electric current B) having different timings to the seat sensors so that pulse signals (electric current) are supplied to the operators who have access to the SWs 1 to 3.

When an operator operates the SW, the control unit according to the second embodiment detects, through the SW sensor, the pulse signal (electric current) that has been supplied from the pulse-signal supplying unit to the operator, and identifies the operator based on a timing of a detected pulse signal (electric current) (see (3) and (4) of FIG. 7). Specifically, when an operator (driver) in a driver seat operates the SW 1, the control unit receives, from the SW sensor 1 through a body of the driver and the control board 1, the pulse signal A (electric current A) that has been supplied to the seat sensor in a driver seat, and an ON signal of the SW 1 is supplied to the control board 1. The control unit then determines that the pulse signal is the pulse signal A (electric current A) based on a timing of the pulse signal (electric current) that has been supplied to the control unit, and determines that an operator who has operated the SW 1 is a driver in a driver seat.

As described above, in the in-vehicle system according to the second embodiment, when an operator operates the hardware switch, a pulse signal (electric current) that has been supplied to the operator is detected via a SW sensor equipped to the hardware switch, and the operator is identified based on a timing of a detected pulse signal. Therefore, even when a hardware switch instead of the touch panel is arranged as an input unit, it is possible to accurately identify an operator using the hardware switch.

Figure 8:
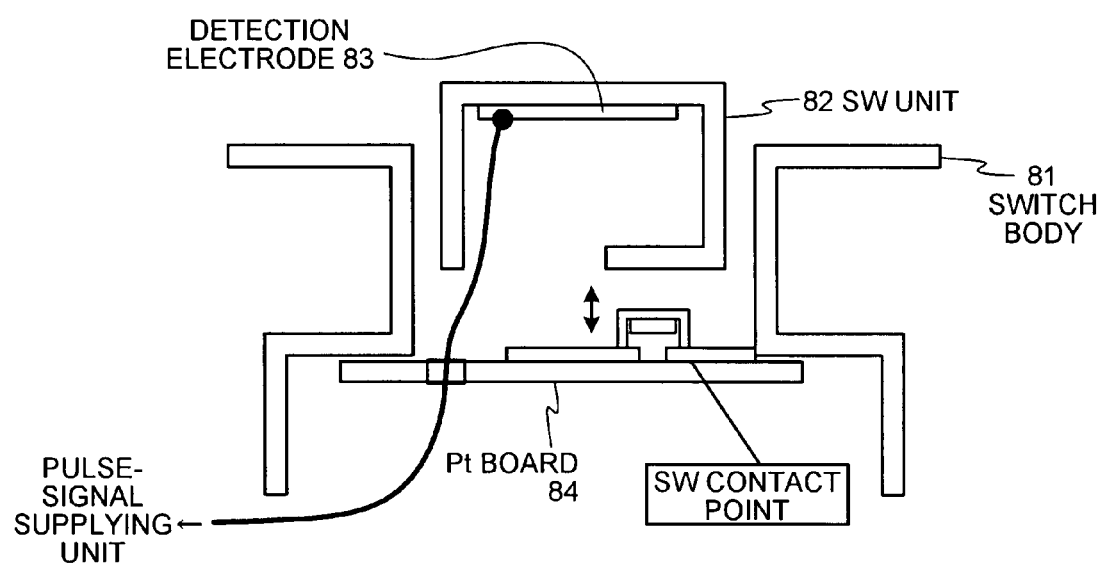
FIG. 8 is a schematic diagram of a hardware switch according to the second embodiment.

FIG. 8 is a schematic diagram of a hardware switch according to the second embodiment. As shown in FIG. 8, the hardware switch (the SWs 1 to 3) includes an SW unit 82, a detection electrode (SW sensor) 83, and a platinum (Pt) board 84. A switch body 81 accommodates electric units, such as the SW unit 82 and the Pt board 84, that constitute the SW. Specifically, the switch body 81 is fixed to the in-vehicle system or a vehicle body to fix the electric units, such as the SW unit 82 and the Pt board 84, so that the electric units are not removed.

The SW unit 82 accommodates the detection electrode 83 that detects the pulse signal (electric current) to be supplied to an operator, and arranged at a position with a predetermined distance from the Pt board 84. Specifically, when the SW unit 82 is configured to be pressed by an operator, the SW unit 82 is arranged in such a manner that the SW unit 82 is slightly projected from the switch body 81 to make it easier for an operator to press the SW unit 82. The SW unit 82 can be an ON-OFF switch. For example, when an operator presses the SW unit 82, an SW contact turns to be ON.

The detection electrode 83 is an electrode that detects a pulse signal (electric current) supplied to an operator. Specifically, when a driver operates the SW, the detection electrode 83 detects, through a body of the driver, a pulses signal A (electric current A) that has been supplied to the driver, and sends the pulse signal A to a corresponding control board.

The Pt board 84 is a printed circuit board that mounts thereon electronic components, such as an integrated circuit, a resistor, and a condenser, and in a plate or film form on which an electronic circuit is arranged by connecting the electronic components with each other. Specifically, the Pt board 84 includes a circuit that outputs a signal indicative of an ON/OFF state of the SW contact to a corresponding control board. When an operator presses the SW unit 82, the Pt board 84 outputs a signal indicating that the SW contact is ON.

Figure 9:
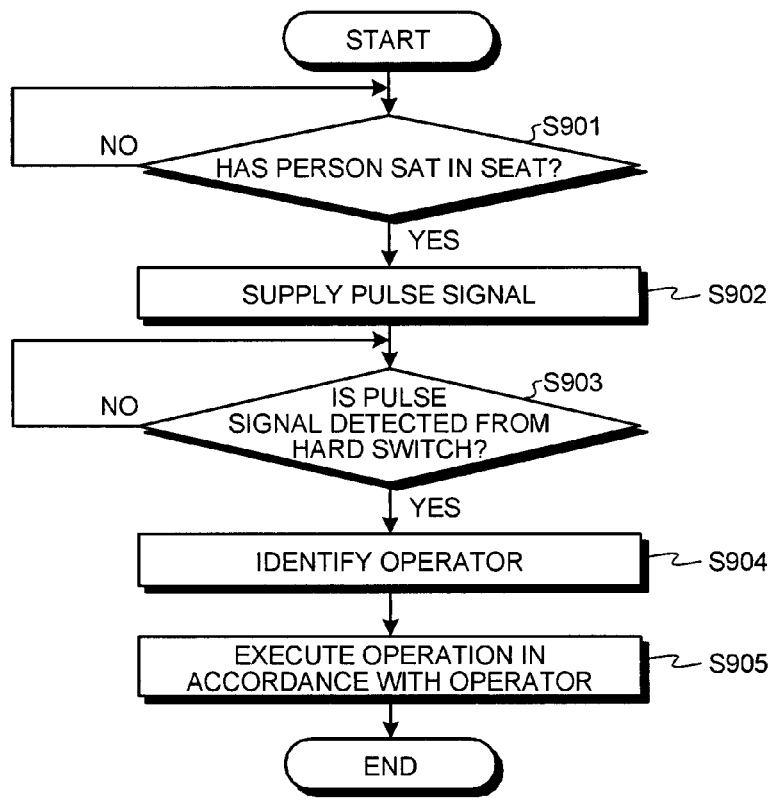
FIG. 9 is a flowchart of a hardware switch operator identification process performed in the in-vehicle system according to the second embodiment.

FIG. 9 is a flowchart of a hardware switch operator identification process performed in the in-vehicle system according to the second embodiment. As shown in FIG. 9, when the seat sensor in a driver seat or a passenger seat detects that a person has sat in a corresponding seat (Yes at step S901), the pulse-signal supplying unit supplies a pulse signal (electric current) to the seat sensor that has detected a person sat in the seat (step S902).

Specifically, when a driver and a passenger have sat in a driver seat and a passenger seat, the seat sensors in the driver seat and the passenger seat detect that the driver and the passenger have sat in the seat, and outputs signals indicating that the driver and the passenger have sat in the seats to the pulse-signal supplying unit. Upon receiving the signals, the pulse-signal supplying unit supplies pulse signals (electric current A and B) having different timings to the seat sensors in the driver seat and the passenger seat, respectively.

When an ON signal is detected from the SWs 1 to 3 via the control boards 1 to 3 (Yes at step S903), the control unit identifies an operator based on a timing of a pulse signal (electric current) detected from the SW sensors 1 to 3 (step S904). The control unit then executes a process in accordance with contents of an operation based on an operated SW and a identified operator, or causes a corresponding device to execute the operation (step S905).

For example, assume that an operation for turning up volume of an image (e.g., television) viewed by a passenger in a passenger seat, and an operation for switching a display of an image (e.g. image of the car navigation system) viewed by a driver in a driver seat are operated by using the same hardware switch (the SW 1). Upon receiving an operation from a driver in the driver seat through the SW 1, the control unit detects a pulse signal through the driver via the control board 1, identifies that the driver is an operator based on a timing of a detected pulse signal, outputs a signal indicating that the driver is the operator, and outputs a signal indicating that the SW 1 has been operated. Accordingly, the control unit executes switching of display of the car navigation system, or causes a corresponding device to perform an instructed operation.

On the other hand, when the control unit determines that a passenger in a passenger seat is an operator, the control unit executes turning up volume on a television in accordance with an operation of the passenger, or causes a corresponding device to perform an instructed operation.

Figure 10:
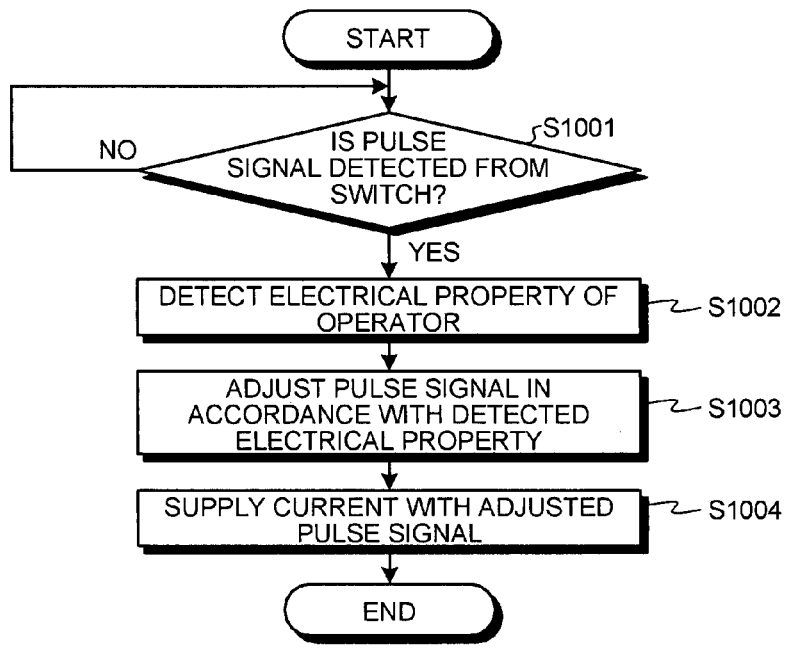
FIG. 10 is a flowchart of a pulse adjustment process by using the hardware switch shown in FIG. 8.

FIG. 10 is a flowchart of a pulse adjustment process by using the hardware switch shown in FIG. 8. As shown in FIG. 10, when a pulse signal is detected from a hardware switch (the SW sensor) (Yes at step S1001), the pulse-signal supplying unit detects electrical property of an operator from a pulse signal that has been detected through the hardware switch via a body of the operator (step S1002).

Specifically, when a person in a driver seat operates the SW 1, the control unit detects that the pulse signal from the control board 1 is the pulse signal A (electric current A), and outputs a signal indicating that the pulse signal A (electric current A) has been detected to the pulse-signal supplying unit. Upon receiving such a signal, the pulse-signal supplying unit detects electrical property of an operator whether the operator easily conducts electricity, based on the pulse signal A (electric current A).

The pulse-signal supplying unit adjusts a pulse signal (electric current) to be supplied to an operator based on detected electrical property (step S1003), and supplies an adjusted pulse signal (electric current) to a corresponding seat sensor (step S1004).

Specifically, when detecting such electrical property of the operator (driver) from the pulse signal A (electric current A) that the operator does not easily conduct electricity, the pulse-signal supplying unit adjusts the pulse signal to be supplied to the operator, by widening the pulse width or increasing the pulse height, and then supplies an adjusted pulse signal (electric current) to the seat sensor in a driver seat.

As described above, according to the second embodiment, when an operator operates a hardware switch, a pulse signal that has been supplied to the operator is detected via the hardware switch, and the operator is identified from a timing of a detected pulse signal. Therefore, it is possible to accurately identify the operator by using the hardware switch instead of the touch panel.

According to the second embodiment, similar to the first embodiment, the pulse signal is supplied to the seat sensor that has detected a person in a seat, when the seat sensor detects the person in the seat. However, it is possible to supply the pulse signal exclusively when it is detected that both a driver and a passenger have sat in the driver seat and the passenger seat because an operator needs to be identified in such a case.

Furthermore, it is explained that the present invention is applied to the dual display. However, it is possible to apply the present invention to a case where a driver and a passenger view the same image on each display. For example, it is possible to identify an operator and not to receive an operation performed by a driver during a driving.

Moreover, it is explained that the control board receives the pulse signal and an ON signal of the SW, and the control board that has received the ON signal outputs the pulse signal to the control unit. However, it is possible to input a signal in which the ON signal and the pulse signal are superimposed to the control board, and output the pulse signal or a signal in which the pulse signal and the ON signal are superimposed to the control unit. Furthermore, it is possible to input the ON signal directly to the control unit without passing the control board.

The pulse adjustment process can be continuously performed because electrical property of a person changes depending on an environment. It is possible to adjust the pulse signal at a start of activating the in-vehicle system by outputting a display that instructs an operator to touch the touch panel. Furthermore, the pulse-signal supplying unit detects electrical property of a person, and adjusts the pulse signal in the pulse adjustment process. However, it is possible for the control unit to detect electrical property of an operator based on the pulse signal that has input through the operator, and to adjust electric current output from the control unit. Moreover, it is possible to adjust the pulse signal based on a prediction of a body shape of an operator.

Although it is explained in the first and the second embodiments that an operator is identified by detecting a pulse signal via an input unit when the operator operates the input unit, such as a touch panel or a hardware switch. However, it is possible to sample pulse signals for a plurality of times via the input unit, and identify an operator based on a sampling result.

A third embodiment of the present invention is explained below with reference to FIGS. 11 to 13. When an operator operates an input unit, pulse signals, which have been supplied to the operator, are sampled for a plurality of times via the input unit, and the operator is identified based on whether pulse signals obtained from the sampling satisfy a predetermined condition. A configuration of an in-vehicle system according to the third embodiment is the same as those explained in the first and the second embodiment, and explanation thereof is omitted.

When an operator once operates the input unit, the in-vehicle system according to the third embodiment performs sampling of pulse signals fifteen times via the input unit. The pulse signals sampled fifteen times include the following signals: a pulse signal at a timing of being supplied to a driver in a driver seat; a pulse signal at a timing of being supplied to a passenger in a passenger seat; a pulse signal at a timing when a driver and a passenger operate, or when the pulse signals supplied to the driver and the passenger overlap with each other; and a pulse signal at timings other than above timings due to noise. Although the pulse signals are sampled fifteen times, the number of times of sampling is not thus limited, and pulse signals can be sampled twenty times. It is assumed that the pulse signals are supplied to a seat sensor at a period enabling sampling of the pulse signals fifteen times by one operation (pressing).

The in-vehicle system identifies an operator based on condition whether the pulse signals sampled fifteen times satisfy a predetermined condition. It is explained below, with reference to the FIGS. 11 to 13, the predetermined condition by which the in-vehicle system identifies an operator based on the pulse signals that have been sampled fifteen times for the operator.

FIG. 11 is a table of examples of conditions for identifying an operator by using sampled pulse signals. The in-vehicle system samples pulse signals, which have been supplied to an operator, via the input unit when the operator operates the input unit. The in-vehicle system identifies the operator by using the following pulse signals from among the pulse signals sampled fifteen times: a pulse signal indicative of an driver, i.e., a pulse signal at a timing of being supplied to a driver in a driver seat; and a pulse signal indicative of a passenger, i.e., a pulse signal at a timing of being supplied to a passenger in a passenger seat.

Specifically, as shown in FIG. 11, the in-vehicle system determines that a person in a driver seat is an operator when signals indicative of a person in the driver seat has been detected eight times or more, i.e., pulse signals at timings of being supplied to the driver are detected eight times or more, from among the pulse signals sampled fifteen times (see 1 of FIG. 11). When signals indicative of a person in the passenger seat has been detected eight times or more, i.e., pulse signals at timings of being supplied to the passenger are detected eight times or more, from among the pulse signals sampled fifteen times, the in-vehicle system determines that a person in the passenger seat is an operator (see 2 of FIG. 11). When the pulse signals indicative of a driver and indicative of a passenger are detected less than eight times, i.e., the pulse signals at timing of being supplied to the driver and the pulse signals at timing of being supplied to the passenger are detected less than eight times, the in-vehicle system determines that there is no operator (see 3 of FIG. 11).

It is possible to add detailed conditions as shown in FIG. 12, in addition to the conditions shown in FIG. 11, for the in-vehicle system according to the third embodiment to identify an operator. FIG. 12 is a table of examples of conditions for identifying an operator by using sampled pulse signals. The conditions shown in FIG. 12 are different from those shown in FIG. 11 in that an operator is whether a driver, a passenger, or other passengers, based on a signal indicative of both a driver and a passenger, i.e., a pulse signal at a timing where a driver and a passenger operate, or the pulse signals supplied to the driver and the passenger overlap with each other, in addition to the signal indicative of the driver and the signal indicative of the passenger.

A difference between the conditions shown in FIGS. 11 and 12 is exclusively described below. As shown in 3 of FIG. 12, the in-vehicle system identifies an operator by prioritizing an operation performed by a person in a driver seat when, from among the pulse signals sampled fifteen times, number of times of detecting the signal indicative of both a driver and a passenger, i.e., a pulse signal at a timing where a driver and a passenger operate, is larger than the number of times of detecting the signal indicating that there is no operator, i.e., the pulse signals at timings other than above timings due to noise.

When the number of detecting the signal indicative of a driver and a passenger is larger than the number of detecting the signal indicating that there is no operator from among the pulse signals sampled fifteen times, and when total number of detecting the signal indicative of the driver is detected eight times or more and the signal indicative of a driver and a passenger is equal to or larger than ten from among the pulse signals sampled fifteen times, the in-vehicle system identifies that a driver is the operator (see 3-1 of FIG. 12). In the same situation, when the total number is smaller than ten, the in-vehicle system identifies that there is no operator (see 3-2 of FIG. 12).

When the number of detecting the signal indicative of both a driver and a passenger is larger than the number of detecting the signal indicating that there is no operator from among the pulse signals sampled fifteen times, by prioritizing an operation by a person in a passenger seat, the in-vehicle system identifies that a person in a passenger seat is the operator. In this case, when the number of detecting the signal indicative of both a driver and a passenger is larger than the number of detecting the signal indicating that there is no operator from among the pulse signals sampled fifteen times, and when total number of detecting the signal indicative of the passenger is detected eight times or more and the signal indicative of a driver and a passenger is equal to or larger than ten from among the pulse signals sampled fifteen times, the in-vehicle system identifies that a passenger is the operator (see 3-3 of FIG. 12). In the same situation, when the total number is smaller than ten, the in-vehicle system identifies that there is no operator (see 3-4 of FIG. 12).

When the number of detecting the signal indicative of both a driver and a passenger is smaller than the number of detecting the signal indicating that there is no operator, the in-vehicle system identifies that there is no operator (see 4 of FIG. 12). As described above, it is possible to previously determine which information is prioritized. Furthermore, it is possible to prioritize an operator that has been identified in a previous operation because an operation is likely to be successively performed or to prioritize an operation by a person in a passenger seat during a driving.

It is possible for the in-vehicle system to identify an operator from the most detected signal. A process of identifying an operator from the most detected signal is described with reference to FIG. 13. FIG. 13 is a table of examples of conditions for identifying an operator by using sampled pulse signals.

As shown in FIG. 13, the in-vehicle system identifies a driver as the operator when the number of times of detecting the signal indicative of a driver is the largest from among the pulse signals sampled fifteen times (see 1 of FIG. 13). When the number of times of detecting the signal indicative of a passenger in a passenger seat is the largest from among the pulse signals sampled fifteen times, the in-vehicle system identifies a passenger in the passenger seat as the operator (see 2 of FIG. 13).

When the number of times of detecting the signal indicative of both a driver and a passenger is the largest, the in-vehicle system identifies an operator by prioritizing either an operation by a driver or an operation by a passenger (see 3 of FIG. 13). Specifically, when an operation by a driver is prioritized, the in-vehicle system identifies a driver as the operator (see 3-1 of FIG. 13) when the number of times of detecting the signal indicative of both a driver and a passenger is the largest, and the total number of detecting the signal indicative of a driver and the signal indicative of both a driver and a passenger is equal to or larger than ten. In the same situation, when the total number is smaller than ten, the in-vehicle system identifies that there is no operator (see 3-2 of FIG. 13).

On the other hand, when an operation by a passenger is prioritized, the in-vehicle system identifies a person in a passenger seat is the operator when the number of times of detecting the signal indicative of both a driver and a passenger is the largest, and the total number of detecting the signal indicative of a passenger and the signal indicative of both a driver and a passenger is equal to or larger than ten (see 3-3 of FIG. 13). In the same situation, when the total number is smaller than ten, the in-vehicle system identifies that there is no operator (see 3-4 of FIG. 13).

When the number of times of detecting the signal indicating that there is no operator, the in-vehicle system identifies an operator based on the largest number of times of detecting one of the signal indicative of a driver, the signal indicative of a passenger, and the signal indicative of both a driver and a passenger, except the signal indicating that there is no operator (see 4 of FIG. 13).

Specifically, when the number of times of detecting the signal indicating that there is no operator is the largest from among the signals sampled fifteen times, and when the signal having the second largest number of times of detecting is the signal indicative of a driver, the in-vehicle system identifies that a driver is the operator (see 4-1 of FIG. 13). When the signal having the second largest number of times of detecting is the signal indicative of a passenger, the in-vehicle system identifies that a passenger is the operator (see 4-2 of FIG. 13).

When the number of times of detecting the signal indicating that there is no operator is the largest from among the signals sampled fifteen times, and when the signal having the second largest number of times of detecting is the signal indicative of both a driver and a passenger, the in-vehicle system identifies an operator by prioritizing either an operation by a driver or an operation by a passenger (see 4-3 of FIG. 13).

When an operation by a driver is prioritized, the in-vehicle system identifies that a driver is the operator when the number of times of detecting the signal indicating that there is no operator is the largest from among the pulse signals sampled fifteen times, the signal having the second largest number of times of detecting is the signal indicating a driver and a passenger, and the total number of times of detecting the signal indicative of a driver and the signal indicative of both a driver and a passenger is equal to or larger than ten, (see 4-3-1 of FIG. 13). In the same situation, when the total number is smaller than ten, the in-vehicle system identifies that there is no operator (see 4-3-2 of FIG. 13).

On the other hand, when an operation by a person in a passenger seat is prioritized, the in-vehicle system identifies that a passenger is the operator when the number of times of detecting the signal indicating that there is no operator is the largest from among the pulse signals sampled fifteen times, the signal having the second largest number of times of detecting is the signal indicating both a driver and a passenger, and the total number of times of detecting the signal indicative of a passenger and the signal indicative of both a driver and a passenger is equal to or larger than ten, (see 4-3-3 of FIG. 13). In the same situation, when the total number is smaller than ten, the in-vehicle system identifies that there is no operator (see 4-3-4 of FIG. 13).

As described above, according to the third embodiment, when an operator operates the input unit, the pulse signals that have been supplied are sampled for a plurality of times via the input unit. An operator is then identified when the sampled pulse signals satisfy a predetermined condition. Therefore, it is possible to identify an operator in consideration of noise to the pulse signal to be supplied. As a result, it is possible to prevent erroneous detection of an operator, resulting in accurately identifying an operator.

The information including various data and parameters described in FIGS. 11 to 13 can be arbitrarily changed unless otherwise identified. It is possible, as described above, to previously determine which information is prioritized depending on a user. It is still possible to prioritize an operator that has been identified in a previous operation because an operation is likely to be performed successively or to prioritize an operation by a passenger during a driving.

In the first to the third embodiments, it is explained that an operator is identified by detecting a pulse signal via the input unit after an operator operates the input unit such as the touch panel or the hardware switch. However, it is possible to identify an operator by detecting a pulse signal via the input unit after detecting that the input unit is turned ON in response to an operation of the input unit such as the touch panel and the hardware switch performed by the operator.

Figure 14:
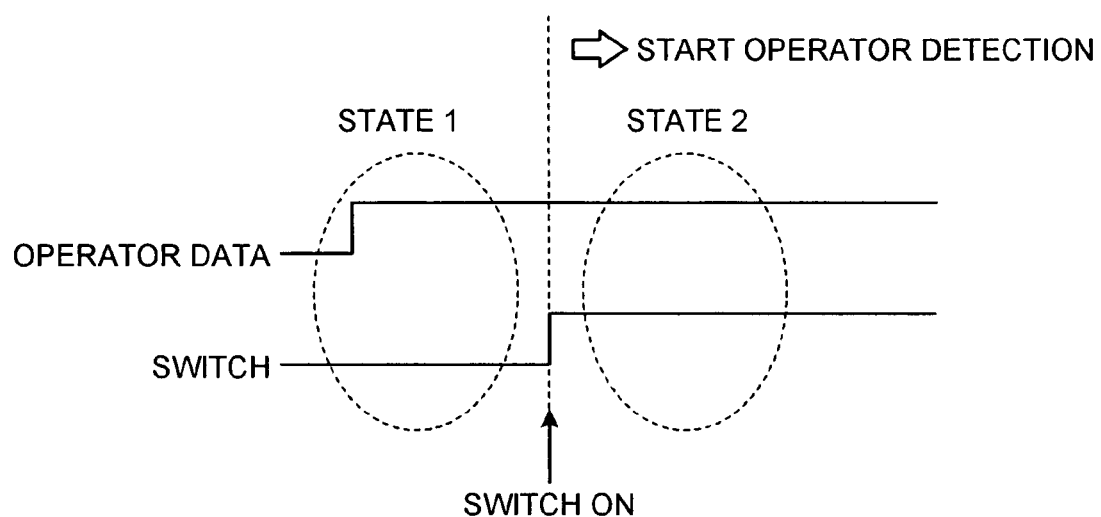
FIG. 14 is a schematic diagram for explaining a state where a pulse signal is detected according to a fourth embodiment of the present invention.

FIG. 14 is a schematic diagram for explaining a state where a pulse signal is detected according to a fourth embodiment of the present invention. A configuration of the switch is the same as those described in the first and the second embodiments, and therefore, explanation thereof is omitted. Specifically, as shown in FIG. 14, when an operator moves his/her finger closer to an input unit to operate the input unit (e.g., the touch panel or the hardware switch), the in-vehicle system detects a pulse signal through a body of the operator (state 1 of FIG. 14). However, the in-vehicle system ignores or aborts the pulse signal detected in the above state, and starts identifying an operator from the pulse signal after the input unit is actually turned ON (state 2 of FIG. 14).

Figure 15:
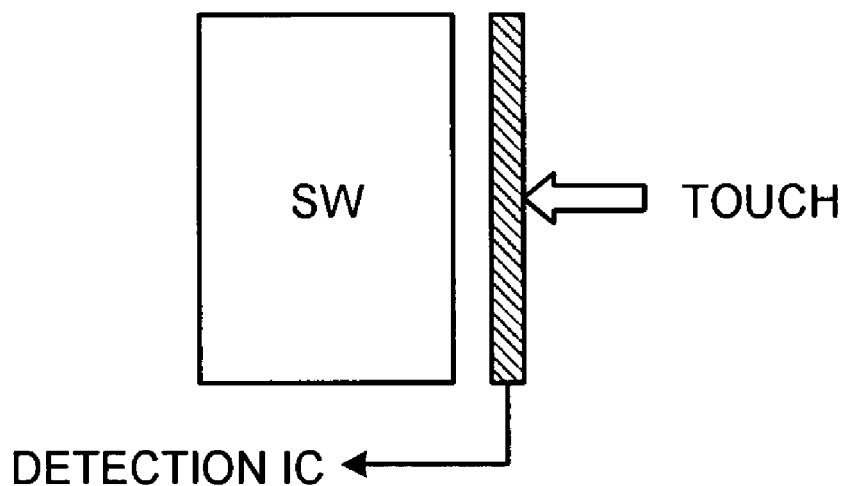
FIG. 15 is a schematic diagram for explaining a state before an operator presses a hardware switch to operate an input unit according to the fourth embodiment.
Figure 16:
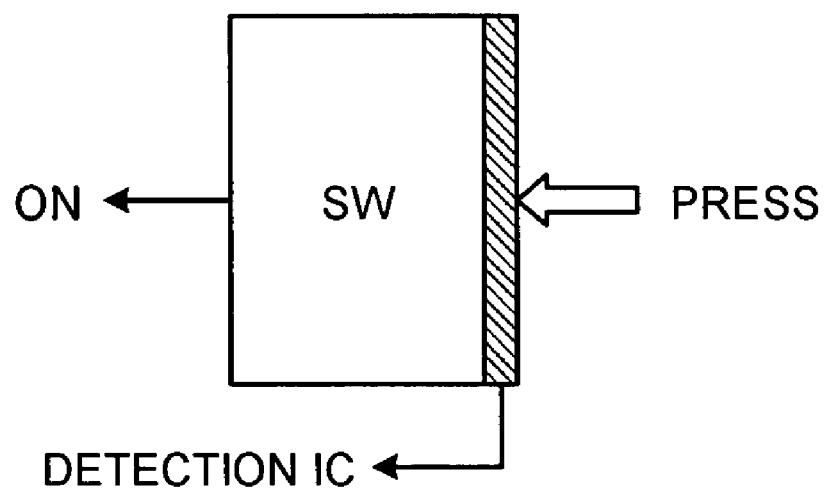
FIG. 16 is a schematic diagram for explaining a state after an operator presses the hardware switch shown in FIG. 15.

A hardware switch is explained below as an example. FIG. 15 is a schematic diagram for explaining a state before an operator presses a hardware switch to operate an input unit. FIG. 16 is a schematic diagram for explaining a state after an operator presses the hardware switch shown in FIG. 15. As shown in FIG. 15, when an operator moves his/her finger closer to the hardware switch to operate the input unit, the in-vehicle system detects a pulse signal through a body of the operator. However, the in-vehicle system aborts the pulse signal detected at this point. As shown in FIG. 16, when it is detected that the hardware switch is actually pressed by the operator, the in-vehicle system starts identifying an operator from a pulse signal detected after the hardware switch is pressed. As for a method of detecting whether the hardware switch has actually been pressed by an operator can be a method of detecting a signal using a circuit, or other known technique.

As described above, according to the fourth embodiment, a pulse signal detected when an operator moves his/her finger closer to a touch panel or a hardware switch to operate such input unit is aborted. An operator is identified based on a signal detected when the operator actually presses the touch panel or the hardware switch. For example, the pulse signal detected in the following situation is aborted: when an operator moves his/her finger closer to the touch panel or the hardware switch to explain how to use the touch panel or the hardware switch to a person in a passenger seat; or clothes of a driver or a passenger touches the touch panel or the hardware switch. Therefore, it is possible to prevent an erroneous detection, and to accurately identify an operator. It is explained in the first to the third embodiments that the pulse signal is supplied to the seat sensor when it is detected that a person has sat in a seat. However, it is possible to achieve the same effect by supplying a pulse signal to the seat sensor when an operator actually presses the touch panel or the hardware switch. Furthermore, as described in the third embodiment, it is possible to achieve the same result by supplying a predetermined number of pulse signals to the seat sensor when an operator actually presses the touch panel or the hardware switch.

Generally, electrical conductivity differs depending on an operator. An in-vehicle system according to a fifth embodiment of the present invention calculates electrical conductivity of an operator from a detected pulse signal. When calculated electrical conductivity is low, the in-vehicle system according to the fifth embodiment changes sensitivity of at least one of the input unit, the pulse-signal supplying unit, and the operator identifying unit.

Figure 17:
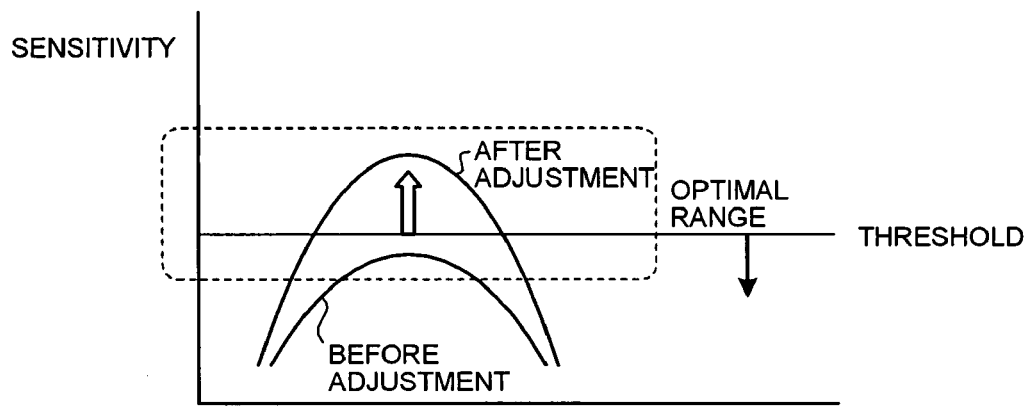
FIG. 17 is a schematic diagram of an example of a pulse signal detected when receiver sensitivity is changed according to a fifth embodiment of the present invention.

FIG. 17 is a schematic diagram of an example of a pulse signal detected when receiver sensitivity is changed. Specifically, as shown in FIG. 17, the in-vehicle system according to the fifth embodiment previously stores therein a threshold of electrical conductivity and calculates electrical conductivity of an operator from a detected pulse signal. When calculated electrical conductivity of an operator is low, the in-vehicle system according to the fifth embodiment changes sensitivity of at least one of the input unit, the pulse-signal supplying unit, and the operator identifying unit. Accordingly, it is possible to detect a pulse signal at an optimal receiving sensitivity with respect to each operator. As a result, it is possible to prevent an erroneous detection. A configuration of the in-vehicle system according to the fifth embodiment is the same as those described in the first and the second embodiments, and therefore, explanation thereof is omitted.

It is possible for the in-vehicle system according to the fifth embodiment to predict electrical conductivity from other factors, without detecting the electrical conductivity directly from the pulse signal, to change sensitivity. Specifically, the in-vehicle system according to the fifth embodiment can predict a body shape of an operator from a length of a seat belt being used by the operator, or angle and frontward/backward position of a seat, and changes sensitivity depending on predicted body shape of the operator.

Specifically, when a length of a seat belt used by an operator is short, or a seat is shifted in a forward position, the in-vehicle system predicts that a body size of the operator sat in the seat is small and a contact area between the operator and a seat sensor is small in accordance with the body size. In such a case, the in-vehicle system increases sensitivity to have higher receiving sensitivity. On the other hand, when a seat belt for a passenger seat is not used, the in-vehicle system aborts a pulse signal indicative of a passenger even when such pulse signal is detected, and identifies that a driver is an operator.

As described above, it is possible to identify an operator by changing sensitivity depending on a body shape of a driver or a passenger based on electrical conductivity, or a length of use of a seat belt instead of electrical conductivity.

An in-vehicle system according to a sixth embodiment of the present invention is described below. The in-vehicle system according to the sixth embodiment detects, when an operator operates the input unit, a pulse signal that has been supplied to the operator, and an operation signal indicating that the operator has operated the input unit (e.g., a signal indicative of operation position of a touch panel, or an ON signal of a hardware switch). Accordingly, the in-vehicle system according to the sixth embodiment adjusts a level of a pulse signal to be supplied to a seat sensor.

The sixth embodiment is explained below with reference to FIGS. 18 to 21. When an operator operates the input unit, the in-vehicle system according to the sixth embodiment detects a pulse signal that has been supplied to the operator, and an operation signal indicating that the operator has operated the input unit. The in-vehicle system according to the sixth embodiment then compares a timing at which the pulse signal that has been supplied to the operator (an operator identification period, e.g., a period for sampling the pulse signals fifteen times), with a timing of detecting the operation signal (an ON period of SW). It is explained below a case that, when the timings are different from each other, a level of the pulse signal to be supplied to the seat sensor is adjusted so that the timings correspond with each other. A configuration of the in-vehicle system according to the sixth embodiment is the same as those described in the first and the second embodiments, and therefore, explanation thereof is omitted.

Figure 18:
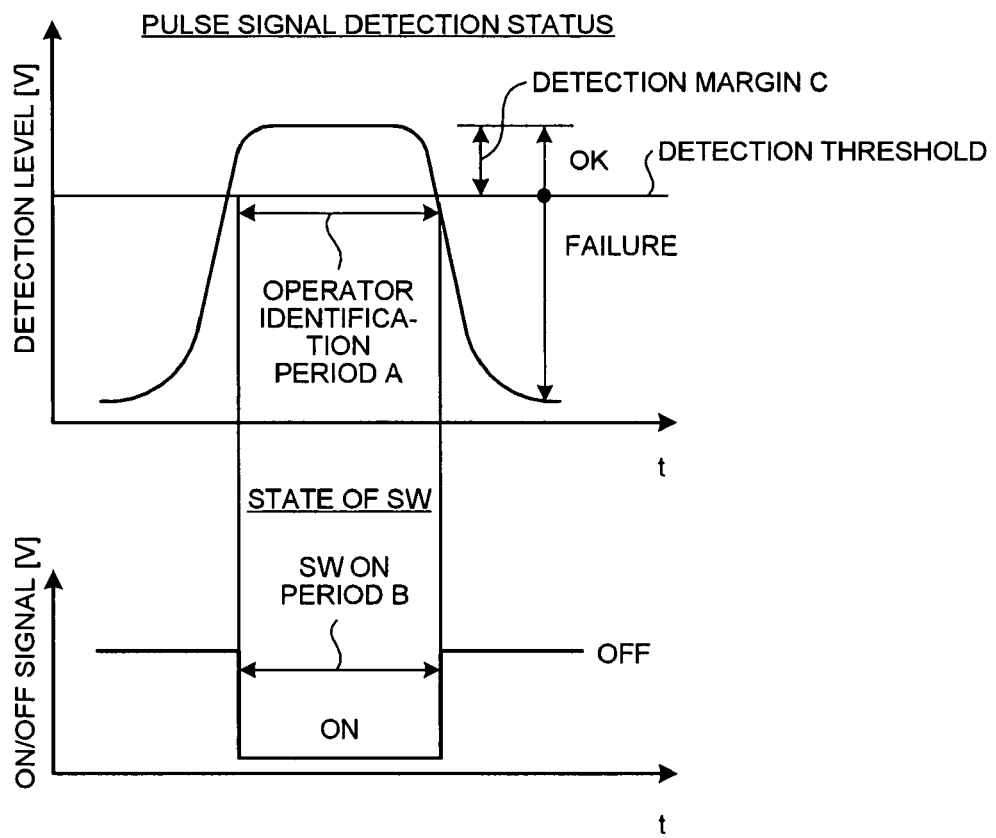
FIG. 18 is a schematic diagram for comparing a state of detection of a pulse signal with a state of a switch according to a sixth embodiment of the present invention.

FIG. 18 is a schematic diagram for comparing a state where a pulse signal is detected with a state of a switch according to the sixth embodiment. As shown in FIG. 18, when a pulse-signal detection state (i.e., a state where a pulse signal is detected) is compared with a SW state (i.e., a state of the hardware switch), the pulse signal can be accurately detected when an ON period B of the SW and an operator identification period A of the pulse-signal detection state correspond with each other. When a detection margin C is large, the pulse signal can be detected easier. The detection level is a level of a pulse signal detected from the seat sensor through a body of the operator. The ON signal of the SW is a signal detected when an operator moves his/her finger closer to the SW or touches the SW.

Figure 19:
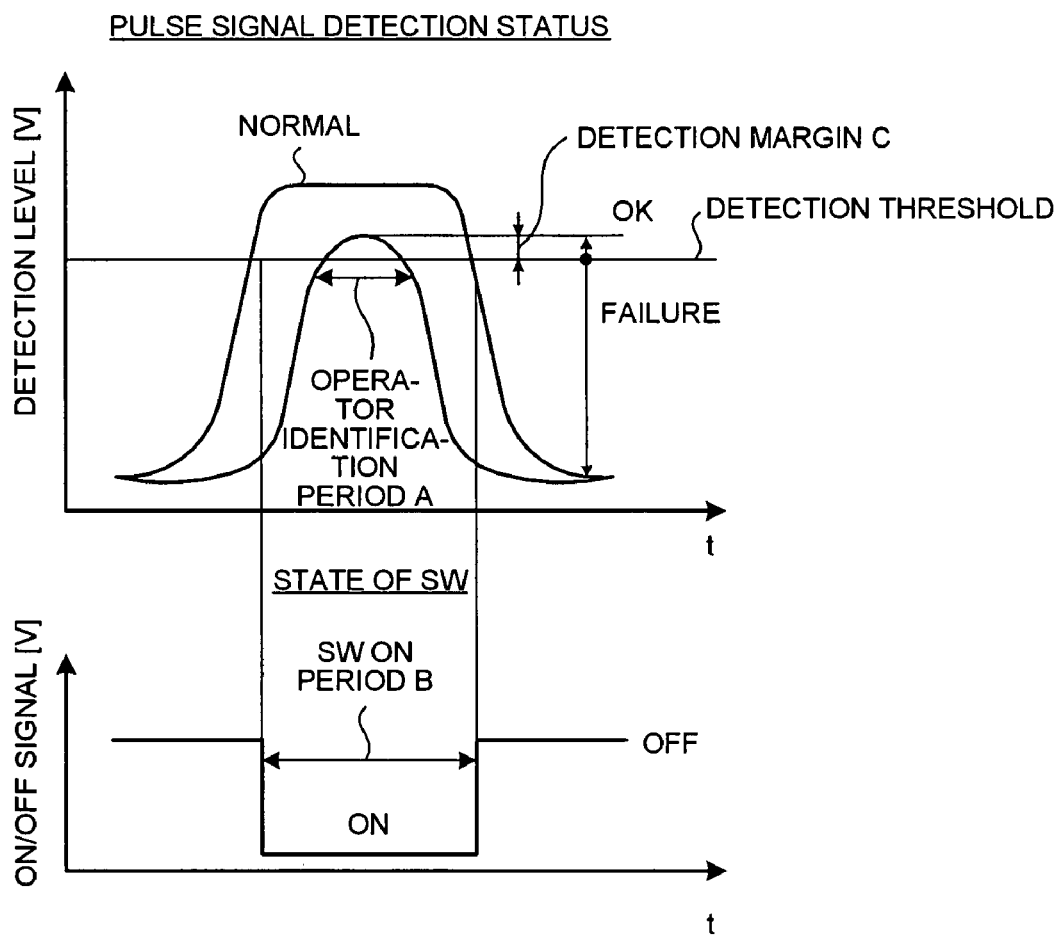
FIG. 19 is a schematic diagram for explaining a case where a level of a detected pulse signal is not sufficient according to the sixth embodiment.

FIG. 19 is a schematic diagram for explaining a case where a level of a detected pulse signal is not sufficient. As shown in FIG. 19, because electrical conductivity differs depending on operators, there is a case where the operator identification period A is shorter than the SW ON period B, and the detection margin C is small. In this case, a level of the pulse signal detected from the seat sensor through a body of the operator is not sufficient. The in-vehicle system according to the sixth embodiment increases a level of the pulse signal to be supplied to the seat sensor so that the timing of detecting the pulse signal (the operator identification period) and the timing of detecting the operation signal 1 (the SW ON period) correspond with each other.

Figure 20:
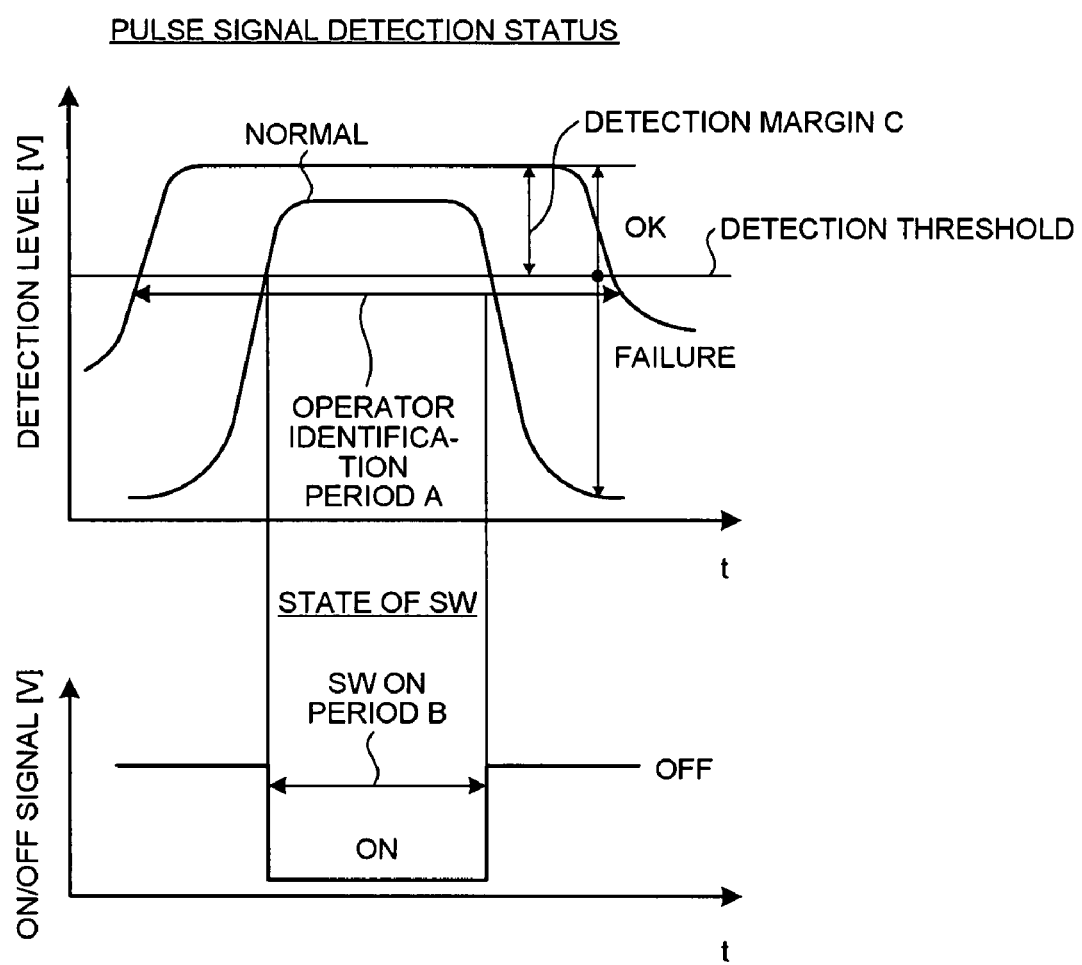
FIG. 20 is a schematic diagram for explaining a case where a level of a detected pulse signal is sufficient according to the sixth embodiment.

FIG. 20 is a schematic diagram for explaining a case where a level of a detected pulse signal is sufficient. As shown in FIG. 20, there is a case where the operator identification period A is longer than the SW ON period B, and the detection margin C is large. In this case, a level of the pulse signal detected from the seat sensor through a body of the operator is sufficient. The in-vehicle system according to the sixth embodiment decreases a level of the pulse signal to be supplied to the seat sensor so that the timing of detecting the pulse signal (the operator identification period) and the timing of detecting the operation signal 1 (the SW ON period) correspond with each other.

As described above, a level of the pulse signal to be supplied to the seat sensor can be periodically changed, and frequency of changing can be arbitrary changed. Similar to those described in the first and the second embodiments, it is possible to adjust the pulse signal at a time of activating the in-vehicle system by displaying a screen for instructing an operator to touch the touch panel. A process of adjusting a level of a pulse signal to be supplied to the seat sensor so that the timing of detecting a pulse signal (SW ON period) and a timing of detecting an operation signal (operator identification period) correspond with each other is described with reference to FIG. 21.

Figure 21:
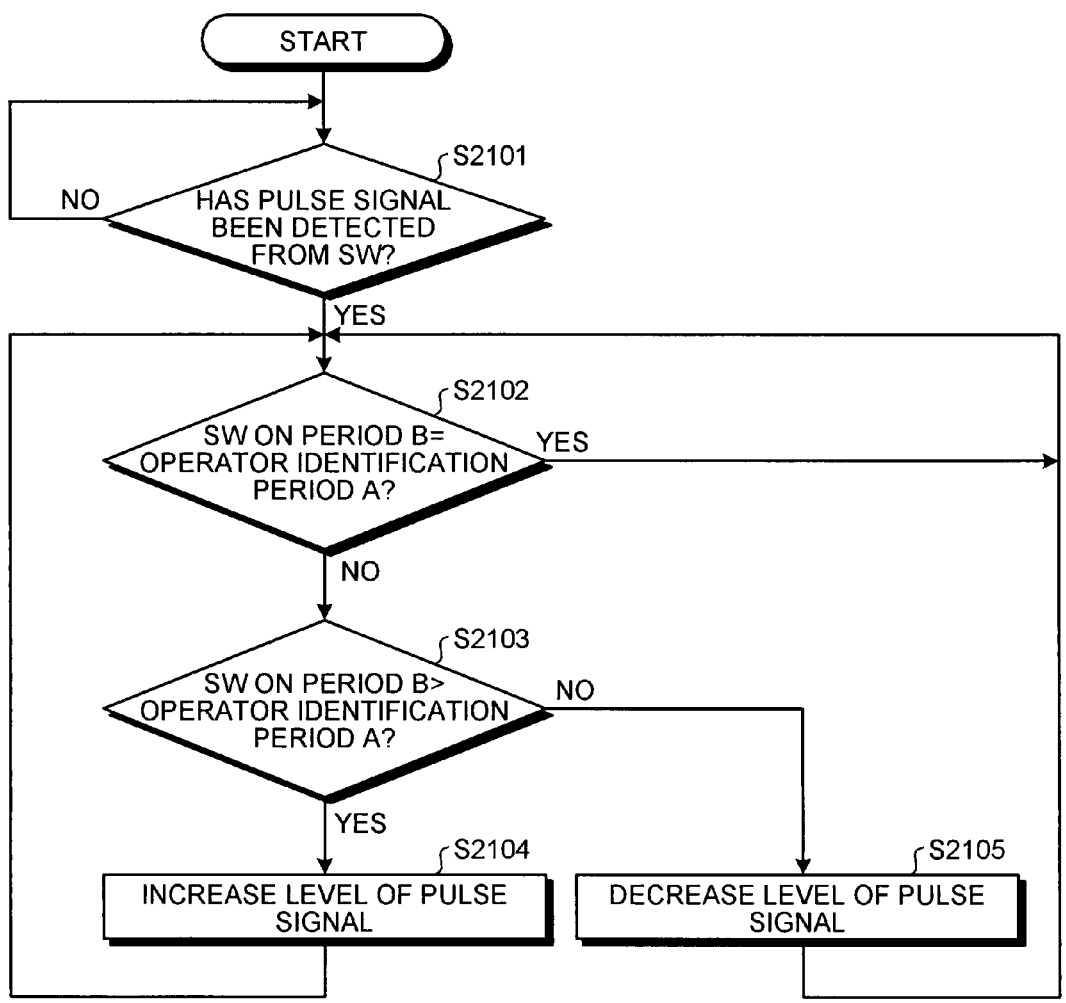
FIG. 21 is a flowchart of a process of adjusting a level of a pulse signal in an in-vehicle system according to the sixth embodiment.

FIG. 21 is a flowchart of a process of adjusting a level of a pulse signal in a in-vehicle system according to the sixth embodiment. As shown in FIG. 21, when detecting a pulse signal from a SW (e.g., a touch panel or a hardware switch) (Yes at step S2101), the in-vehicle system determines whether the timing of detecting an operation signal (operator identification period) and the timing of detecting a pulse signal (SW ON period) correspond with each other (step S2102).

When the SW ON period B and the operator identification period A do not correspond with each other (No at step S2101), the in-vehicle system determines whether the SW ON period B is longer than the operator identification period A (step S2103).

When the SW ON period B is longer than the operator identification period A (Yes at step S2103), the in-vehicle system increases the level of the pulse signal so that the timing of detecting the pulse signal (operator identification period) and the timing of detecting an operation signal (SW ON signal) correspond with each other (step S2104).

When the SW ON period B is shorter than the operator identification period A (No at step S2103), the in-vehicle system decreases the level of the pulse signal so that the timing of detecting the pulse signal (operator identification period) and the timing of detecting an operation signal (SW ON signal) correspond with each other (step S2105).

After adjusting the level of the pulse signal to be supplied to the seat sensor, the process control returns to step S2102 and repeats the above processes.

As described above, when an operator operates the input unit, the in-vehicle system according to the sixth embodiment detects the pulse signal that has been supplied to the operator and an operation signal indicating that the operator has operated the input unit. The in-vehicle system then compares the timing of detecting the pulse signal with the timing of detecting the operation signal. When the timings are different from each other, the in-vehicle system adjusts the level of the pulse signal to be supplied to the seat sensor. Therefore, it is possible to maintain the most optimal detection level for detecting the pulse signal. As a result, it is possible to assuredly prevent an erroneous detection of the pulse signal.

Specifically, when the timing of detecting the pulse signal (the operator identification period) is shorter than the timing of detecting the operation signal 1 (the SW ON period), the in-vehicle system increases the level of a pulse signal to be supplied to the seat sensor so that the timing of detecting a pulse signal (SW ON period) and a timing of detecting an operation signal (operator identification period) correspond with each other. On the other hand, when the timing of detecting the pulse signal (the operator identification period) is longer than the timing of detecting the operation signal 1 (the SW ON period), the in-vehicle system decreases the level of a pulse signal to be supplied to the seat sensor so that the timing of detecting a pulse signal (SW ON period) and a timing of detecting an operation signal (operator identification period) correspond with each other. Therefore, it is possible to maintain the most optimal detection level for detecting a pulse signal.

It is possible to adjust the level of the pulse signal to be supplied to the seat sensor by using the detection margin C in addition to the timing of detecting the pulse signal (operator identification period) and the timing of detecting a pulse signal (SW ON period). For example, it is possible for the in-vehicle system to previously store therein a threshold of a detection margin. When the detection margin C is smaller than the threshold by comparing the detected detection margin C with the threshold, the in-vehicle system increases the level of the pulse signal to be supplied to the seat sensor. When the detection margin C is larger than the threshold, the in-vehicle system decreases the level of the pulse signal to be supplied to the seat sensor.

It is possible to adjust the level based on combination of a method of using the timing of detecting the pulse signal (operator identification period) and the timing of detecting a pulse signal (SW ON period), and a method of using the detection margin C. For example, it is possible to adjust the level of the pulse signal based on the detection margin C for a several times from a start of the system, and then to adjust the level of the pulse signal based on the timing of detecting a pulse signal (operator identification period) and the timing of detecting other pulse signal (SW ON period). Furthermore, it is possible to set a threshold of the timing of detecting the pulse signal (operation identifying period) and the detection margin C, and calculates the difference from the threshold every time a pulse signal is detected. When the difference exceeds the threshold, the pulse signal is adjusted. An order of performing a process of above adjustment is not limited to an order described above, and can be performed in a reverse order.

It is possible to record an adjusted level of the pulse signal with respect to each operator, so that the level can be retrieved depending on an operator when being used. For example, it is possible to record the level with respect to a person, such as "father", "mother", and "brother", and retrieve the level depending on the person.

It is explained, in the sixth embodiment, that the level of the pulse signal to be supplied to the seat sensor is adjusted when the timing of detecting a pulse signal (operator identification period) and the timing of detecting a pulse signal (SW ON period) do not correspond with each other. However, it is possible to adjust a detection threshold of detecting the pulse signal, which is necessary at minimum for identifying an operator, and adjust the level of the pulse signal to be supplied to the seat sensor to a level that is larger than an adjusted detection threshold.

An in-vehicle system according to a seventh embodiment of the present invention is described below with reference to FIGS. 22 to 26. The in-vehicle system according to the seventh embodiment adjusts the level of the pulse signal to be supplied to the seat sensor by adjusting a detection threshold of detecting the pulse signal, which is minimally required for identifying an operator by an operator identifying unit, within a timing in which an operation signal is detected when adjusting the level of the pulse signal to be supplied to the seat sensor. The in-vehicle system according to the seventh embodiment adjusts the level of the pulse signal so that the level exceeds the adjusted detection threshold. A configuration of the in-vehicle system according to the seventh embodiment is the same as those described in the first and the second embodiments, and therefore, explanation thereof is omitted.

Figure 22:
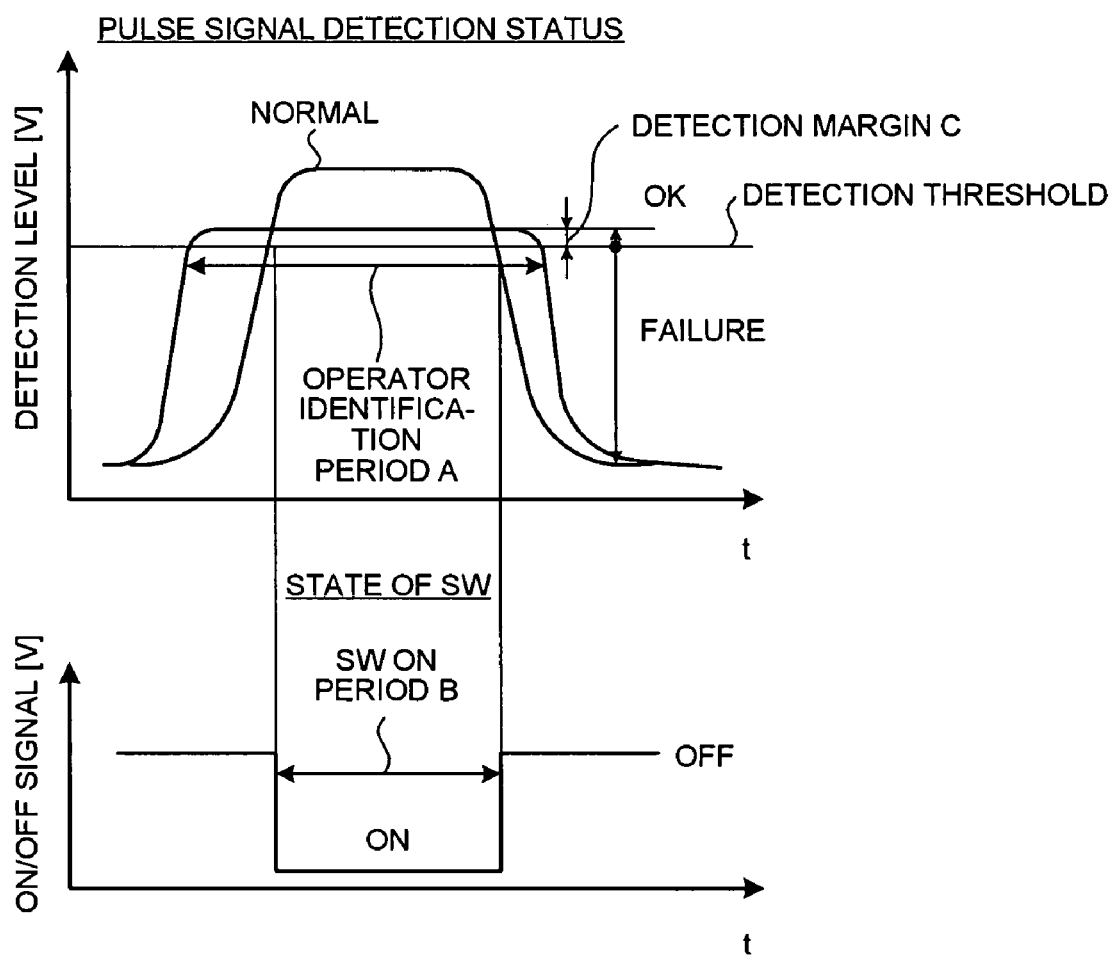
FIG. 22 is a schematic diagram for explaining a case where a detection margin for detecting a pulse signal is not sufficient according to a seventh embodiment of the present invention.

FIG. 22 is a schematic diagram for explaining a case where a detection margin for detecting a pulse signal is not sufficient. Specifically, as shown in FIG. 22, there is a case where the operator identification period A for detecting a pulse signal is sufficient for detecting the pulse signal compared to the SW ON period B. However, the detection margin C is not sufficient, so that it is difficult to have a detection wave corresponds with the SW ON period B by changing the level of the pulse signal to be supplied to the seat sensor as described in the sixth embodiment.

Figure 23:
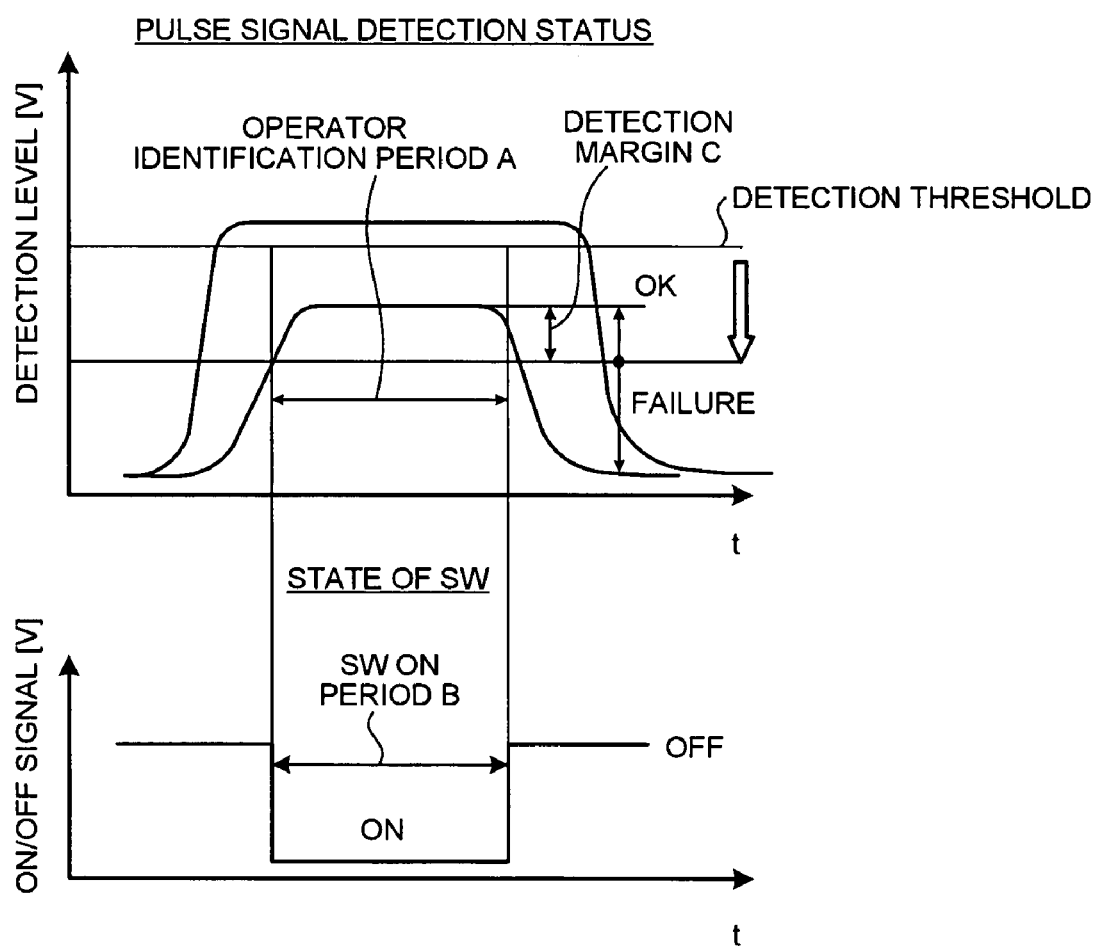
FIG. 23 is a schematic diagram for explaining a case where a level of a pulse signal is adjusted by decreasing a detection threshold shown in FIG. 22.

FIG. 23 is a schematic diagram for explaining a case where a level of a pulse signal is adjusted by decreasing a detection threshold. As shown in FIG. 23, the in-vehicle system according to the seventh embodiment decreases the level of the pulse signal to be supplied to the seat sensor by decreasing the detection threshold, so that a detection wave of the operator identification period A of the pulse signal to be detected corresponds with the detection wave of the SW ON period B.

Figure 24:
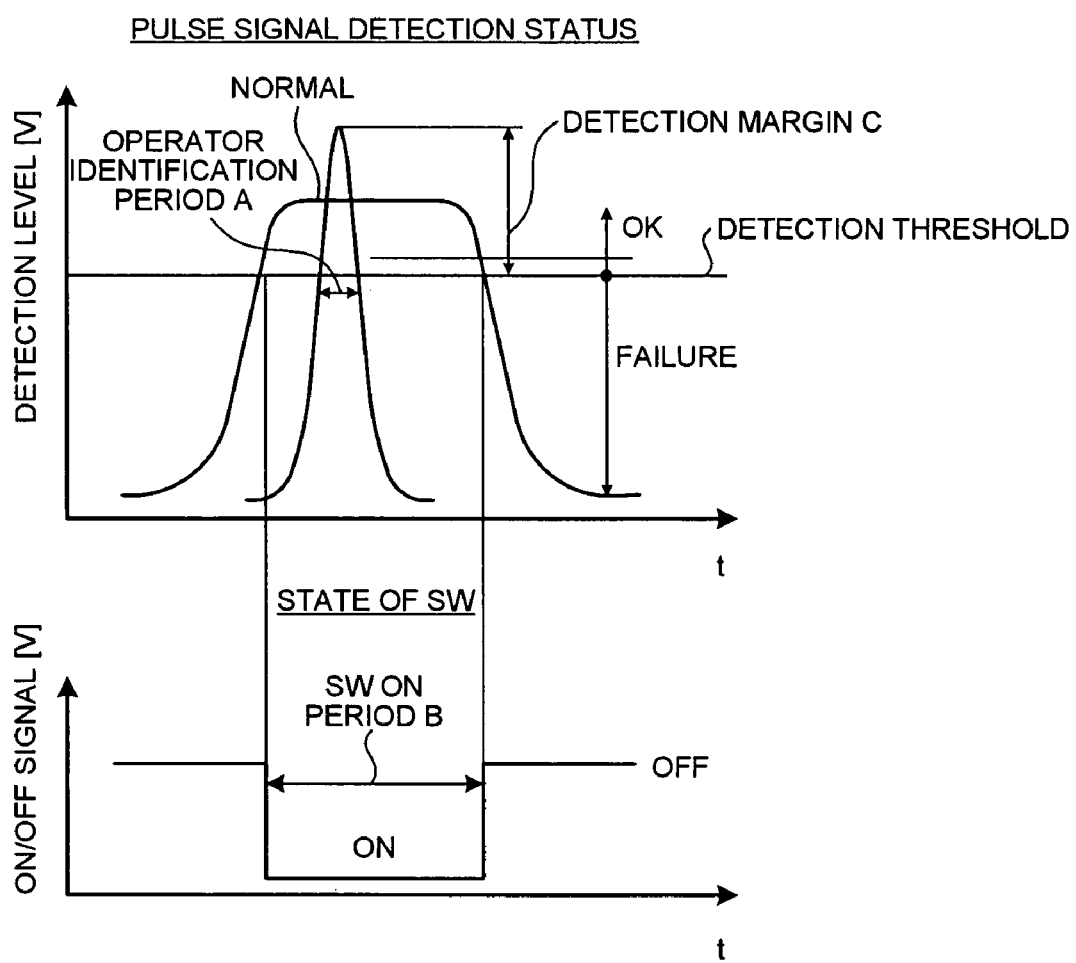
FIG. 24 is a schematic diagram for explaining a case where a detection margin for detecting a pulse signal is high according to the seventh embodiment.
Figure 25:
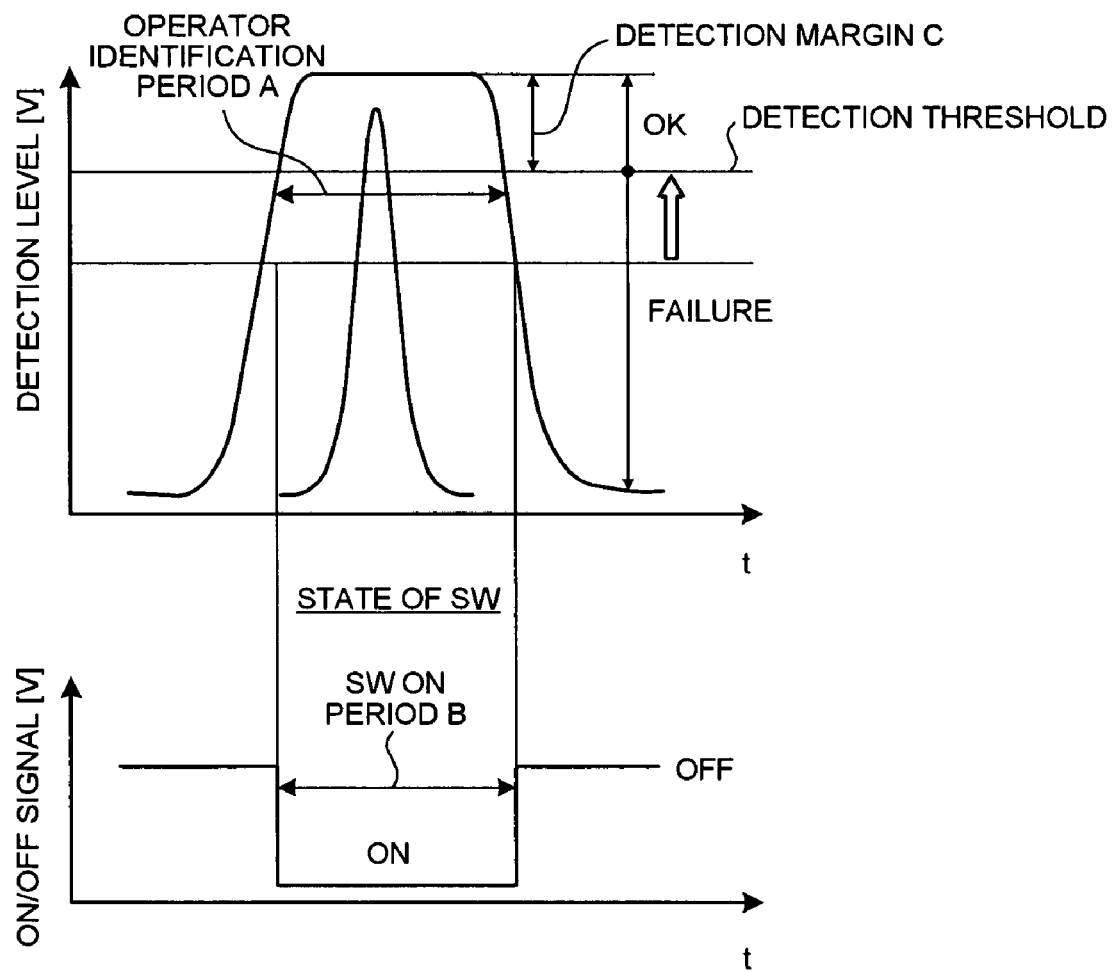
FIG. 25 is a schematic diagram for explaining a case where a level of a pulse signal is adjusted by increasing a detection threshold shown in FIG. 24.

FIG. 24 is a schematic diagram for explaining a case where a detection margin for detecting a pulse signal is excess. FIG. 25 is a schematic diagram for explaining a case where a level of a pulse signal is adjusted by increasing a detection threshold. As shown in FIG. 24, when the detection margin C is excess, and the operator identification period A for detecting the pulse signal is not sufficient compared to the SW ON period B, the in-vehicle system according to the seventh embodiment increases the level of the pulse signal to be supplied to the seat sensor by increasing the detection threshold as shown in FIG. 25, so that the detection wave of the operator identification period A of the pulse signal to be detected corresponds with the detection wave of the SW ON period.

Figure 26:
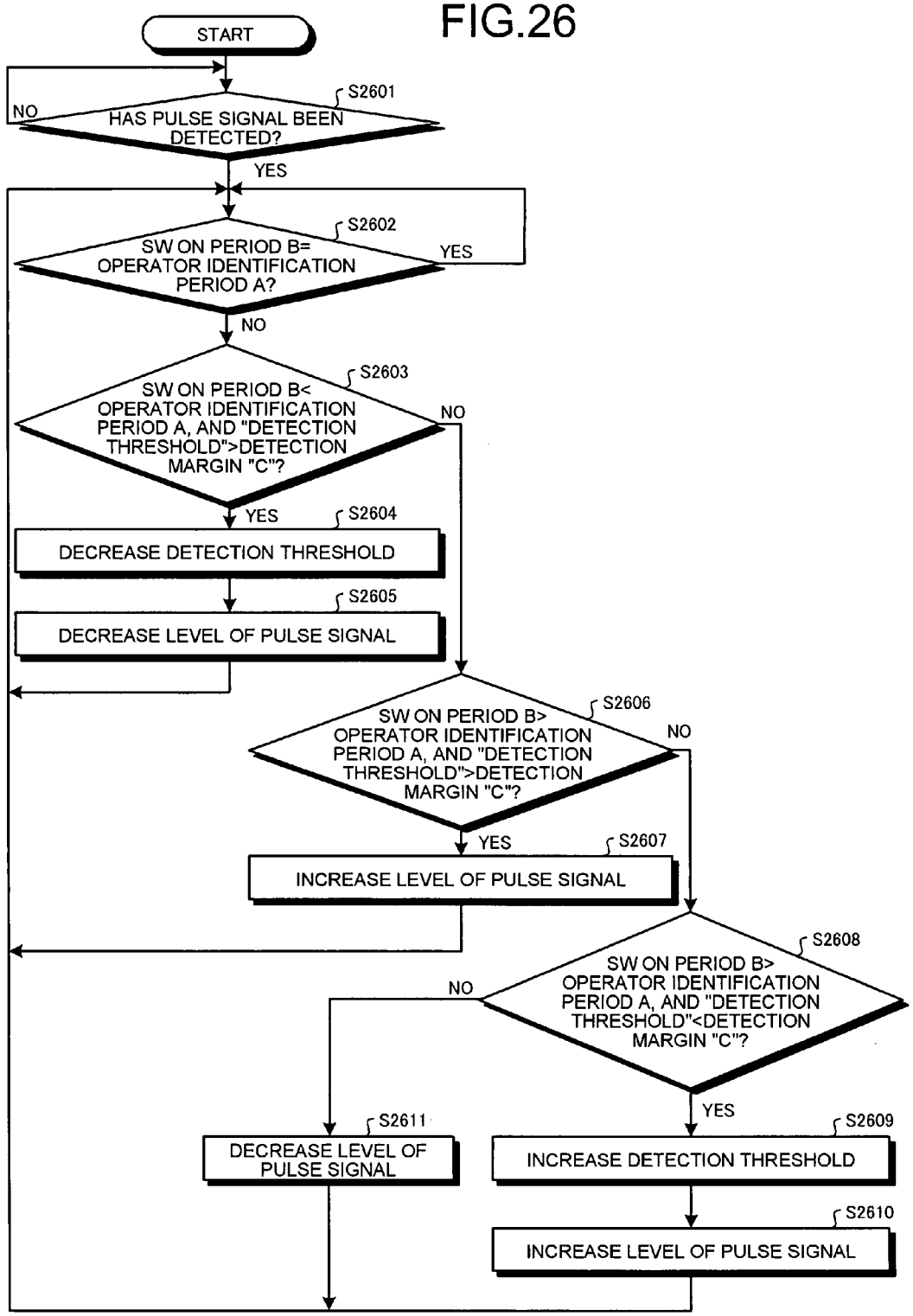
FIG. 26 is a flowchart of a process of adjusting a detection threshold and a level of a pulse signal performed in an in-vehicle system according to the seventh embodiment.

FIG. 26 is a flowchart of a process of adjusting a detection threshold and a level of a pulse signal performed in the in-vehicle system according to the seventh embodiment. As shown in FIG. 26, when detecting the pulse signal from the SW (e.g., the touch panel or the hardware switch) (Yes at step S2601), the in-vehicle system determines whether the timing of detecting the operation signal (SW ON period B) and the timing of detecting the pulse signal (the operator identification period A of a detected pulse signal) correspond with each other (step S2602).

When the SW ON period B and the operator identification period A of the detected pulse signal do not correspond with each other (No at step S2602), the in-vehicle system determines whether the operator identification period A is longer than the SW ON period B, and the detection threshold is larger than the detection margin C (step S2603).

When the operator identification period A is longer than the SW ON period B, and the detection threshold is larger than the detection margin C (Yes at step S2603), the in-vehicle system decreases the detection threshold (step S2604), and decreases the level of the pulse signal to be supplied to the seat sensor (step S2605).

When the operator identification period A is shorter than the SW ON period B, or the detection threshold is smaller than the detection margin C (No at step S2603), the in-vehicle system determines whether the SW ON period B is longer than the operator identification period A, and the detection threshold is larger than detection margin C (step S2606).

When the operator identification period A is longer than the SW ON period B, and the detection threshold is larger than the detection margin C (Yes at step S2603), the in-vehicle system adjusts the level of the pulse signal to be supplied to the seat sensor to increase the level (step S2607).

On the other hand, when the SW ON period B is shorter than the operator identification period A, or the detection threshold is smaller than the detection margin C (No at step S2606), the in-vehicle system determines whether the SW ON period B is longer than the operator identification period A, and the detection threshold is smaller than the detection margin C (step S2608).

When the SW ON period B is longer than the operator identification period A, and the detection threshold is smaller than the detection margin C (Yes at step S2608), the in-vehicle system increases the detection threshold (step S2609), and increases the level of the pulse signal to be supplied to the seat sensor (step S2610).

On the other hand, when the SW ON period B is shorter than the operator identification period A, or the detection threshold is larger than the detection margin C (No at step S2608), the in-vehicle system decreases the level of the pulse signal to be supplied to the seat sensor (step S2611).

When detecting the pulse signal from the SW (Yes at step S2601), the in-vehicle system repeats the processes from steps S2602 to S2611.

As described above, according to the seventh embodiment, when adjusting the level of the pulse signal to be supplied to the seat sensor, the in-vehicle system adjusts the detection threshold of the pulse signal minimally required for identifying an operator within a timing of detecting the operation signal, and adjusts the level of the pulse signal to be supplied to the seat sensor so that the level exceeds the adjusted detection threshold. Therefore, it is possible to detect the pulse signal based on the most optimal level and the detection threshold. As a result, it is possible to prevent an erroneous detection of the pulse signal.

For example, when the operator identification period A is sufficient for detecting the pulse signal compared to the SW ON period B, the in-vehicle system according to the seventh embodiment decreases the level of the pulse signal to be supplied to the seat sensor by decreasing the detection threshold, so that a detection wave of the operator identification period A of the pulse signal to be detected corresponds with a detection wave of the SW ON period B. On the other hand, when the detection margin C is high, and the operator identification period A for detecting the pulse signal is not sufficient compared to the SW ON period B, the in-vehicle system according to the seventh embodiment increases the level of the pulse signal to be supplied to the seat sensor by increasing the detection threshold, so that the detection wave of the operator identification period A of the pulse signal to be detected corresponds with the detection wave of the SW ON period. Although it is explained that the detection threshold of the pulse signal and the level of the pulse signal to be supplied to the seat sensor are adjusted, it is not necessary to adjust both the detection threshold and the level of the pulse signal. It is possible to adjust either the detection threshold or the level of the pulse signal.

Figure 27:
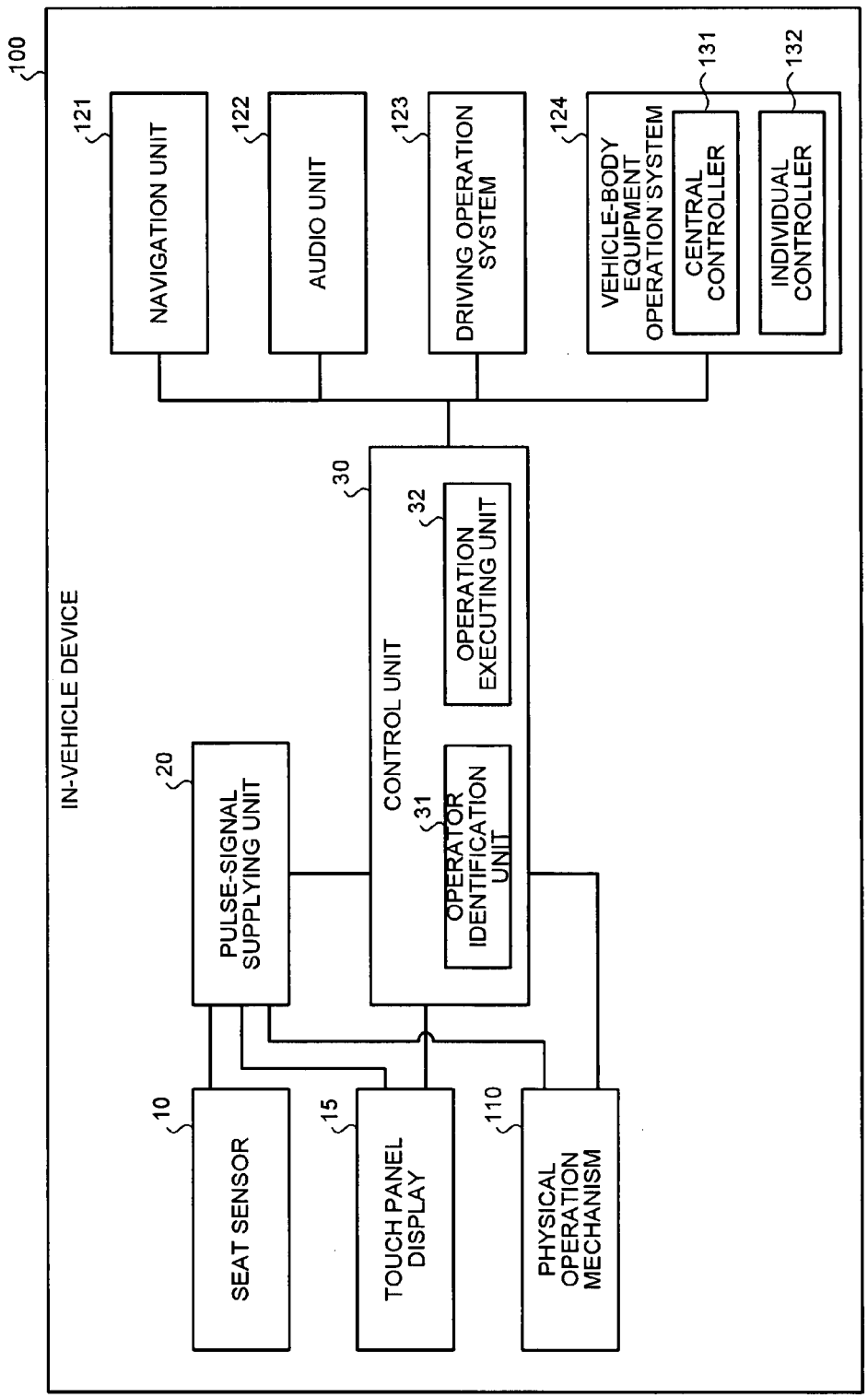
FIG. 27 is a block diagram of an in-vehicle device according to an eighth embodiment of the present invention.

FIG. 27 is a block diagram of an in-vehicle device 100 according to an eighth embodiment of the present invention. The in-vehicle device 100 includes a physical operation mechanism 110 connected to the pulse-signal supplying unit 20 and the control unit 30. The control unit 30 is connected to a navigation unit 121, an audio unit 122, a driving operation system 123, and a vehicle-body equipment operation system 124.

The physical operation mechanism 110 is an operating unit, such as a shift lever/parking break operation mechanism, an indicator switch, an operating unit for a honker, a hardware switch for operating windows, a hardware switch for a door lock, an operating unit of a seat position adjustment mechanism.

The physical operation mechanism 110 includes, similar to the touch panel display 15, a sensor, so that the physical operation mechanism 110 can identify an operator from among a driver and passengers sitting in a vehicle by detecting a pulse signal.

The navigation unit 121 performs a setting and instruction of a driving path of a vehicle, and provides information on road condition or surrounding facilities. The audio unit 122 receives television and radio broadcasts, and replays contents stored in a compact disk (CD), a digital versatile disk (DVD), and a hard disk drive (HDD).

The driving operation system 123 receives an operation related to a driving and executes a received operation. Specifically, as shown in FIG. 28, the driving operation system 123 is a in-vehicle equipment that receives and executes operations for a shift lever, a parking break, a honker, an indicator, a lighting system such as a head light or a road light, a wiper, a defogger for removing fog from a window, an ETC (electronic toll collection), and the like. An operation of cancelling a VSC (vehicle stability control) that prevents a side skid of a vehicle, and an operation for over drive are also included in a driving operation.

The vehicle-body equipment operation system 124 controls an in-vehicle equipment such as a door lock mechanism or a window opening/closing mechanism. These equipments can be individually controlled as an individual controller 132 by a passenger with respect to each seat. A central controller 131 provides a function for centrally controlling individual vehicle equipments with respect to each seat.

Specifically, as shown in FIG. 28, the individual control is performed for operating an air conditioning near each of the seats, changing a seat forward/backward position, adjusting backrest and seat height, turning ON/OFF seat heater arranged for each seat, operating windows, operating a door lock, opening/closing a door.

The central control includes a central door lock that centrally locks/unlocks a plurality of doors, a central window lock that centrally opens/closes windows, and a child lock that prohibits a predetermined door opening/closing operation.

The control unit controls the navigation unit 121, the audio unit 122, the driving operation system 123, and the vehicle-body equipment operation system 124 by using a result of identifying an operator performed by the operator identifying unit 31.

Specifically, as shown in FIG. 29, when a driving operation is detected, if it is identified that a driver has performed the driving operation, the control unit 30 receives and executes the operation. However, if it is identified that a passenger other than the driver has performed the driving operation, the control unit 30 does not receive the operation to prevent a driving operation from being performed by a passenger other than the driver.

In the same situation, if it fails to identify whether a driver has performed the driving operation, the control unit 30 receives and executes above driving operation. This is because when a driver is an actual operator, and if a driving operation is not received, it is difficult for the driver to drive properly.

As for the central control of the vehicle body equipment, when it is identified that a driver has performed the driving operation, the operation is received and executed. However, when it is identified that a passenger other than a driver has performed the operation, or an operator cannot be identified, the operation is not received so that a driving operation is not performed by a passenger other than the driver.

The reason why an operation is not received for the central control when an operator is not identified is because a driving is not affected even when an operation from a driver is not received by the central control of the vehicle body equipment, and it is possible to realize a desired state by the individual control.

Although a driver is exclusively permitted to perform the central control, it is possible to give permission to perform the central control to a passenger, or not to give such permission to a driver.

The individual control of the vehicle body equipment is individually performed with respect to a seat of an operator identified by the operator identifying unit 31. For example, when a driver performs an operation for opening a window, the window near the driver seat opens. When a passenger performs an operation for opening a window, the window near the passenger seat opens.

An operating unit for performing the individual control can be arranged with respect to each seat, or can be shared by a plurality of seats. When the operation unit is arranged with respect to each seat, it is preferable to perform an operation even when an operator is not identified. On the other hand, when the operation unit is shared by a plurality of seats, an operation is not received because it is difficult to determine which seat is to be operated when an operator is not identified.

As for the navigation unit 121 and the audio unit 122, when a driver performs a complicated operation or watches a television and the like, a safe driving may not be performed. Therefore, a part of functions are prohibited during a driving.

On the other hand, for a passenger other than a driver, a safe driving can be maintained even when the passenger performs a complicated operation or watches a television and the like. Accordingly, an operation performed by the passenger is received. When an operator is not identified, it is preferable not to receive the operation because there is a possibility that a driver has performed such an operation.

An input control performed by the control unit 30 is described below with reference to FIG. 31. Displays D1 and D2 shown in FIG. 31 are exemplary screens to be displayed on the touch panel display 15.

On the display D1, operation buttons corresponding to a seat positioning operation and a window opening/closing operation for a passenger seat, and a window opening/closing operation for a driver seat are displayed.

When it is detected, through the touch panel, that a person in the passenger seat touches the operation button corresponding to the seat positioning operation and a window opening/closing operation for the passenger seat, corresponding control is performed. Similarly, when it is detected that a person in a driver seat touches the operation button corresponding to the window opening/closing operation for a driver seat, corresponding operation is performed.

However, when a passenger touches the operation button corresponding to the window opening/closing operation for a driver seat, or a driver touches the operation button corresponding to the operation for the passenger seat, such operations are not received.

In other words, the display D1 describes a case in which the operating unit is arranged with respect to each seat.

On the display D2, an operation button for performing a seat control or a window control is shared by a driver seat and a passenger seat. In this case, when a passenger in a passenger seat operates the window opening/closing button, a window on a passenger seat side opens or closes. When a driver in a driver seat operates the window opening/closing button, a window on a driver seat side opens or closes.

When the display D2 is displayed, if a passenger in a passenger seat operates a seat control button, a passenger seat is adjusted. However, when a driver in a driver seat operates the seat control button, it is preferable not to adjust the seat. If seat adjustment is performed during a driving, safe driving is hardly maintained. In other words, an operation for adjusting a seat is prohibited as a prohibition target operation for a person in a driver seat.

The displays D1 and D2 can be switched from each other depending on an amount of data to be displayed on a screen or a priority order.

As described above, by performing an operation control of the in-vehicle unit by identifying an operator, it is possible to prevent a driving operation from being performed by a person other than a driver, to set permission for the central control of the vehicle body equipment, to prevent an erroneous operation in the individual control, and to decrease a size of the input unit by sharing the operating unit of the individual control.

In some cases, the physical operation mechanism 110 changes its state depending on an instructed operation when the operation is received. For example, a position of an operation lever for operating an indicator changes depending on its ON state and OFF state.

If such an operating unit is controlled to receive or not to receive an operation depending on a identified operator, there is a possibility that a control is not performed even when a lever is moved to an ON state. Thus, inconsistency between an operation state and an operated state may occur.

For the above reason, it is preferable to configure the physical operation mechanism 110 in such a manner that, like a debounce switch, the physical operation mechanism 110 receives an operation regardless of an operation state, and then its position is automatically return to a predetermined position after receiving an operation.

The present invention can be applied to various modifications in addition to the embodiments described above.

For example, it is explained, in the second embodiment, that pulse signals (electric current) having different timings supplied to operators. However, it is possible to supply and detect electric current having different frequencies. Specifically, for identifying an operator from a hardware switch, similar to the touch panel, it is possible to supply electric current having different frequencies to the hardware switch instead of supplying pulse signals (electric current) having different timings. For example, the in-vehicle system supplies electric current having frequency of 100 Hertz to a seat sensor in a driver seat, and electric current having frequency of 50 Hertz to a seat sensor in a passenger seat. The in-vehicle system detects above electric current from the hardware switch, measures the frequencies, and identifies an operator.

Furthermore, it is explained, in the second embodiment, that a pulse of the pulse signal (electric current) to be supplied is adjusted depending on electrical property of an operator. However, as for a hardware switch, it is possible to increase sensitivity by changing the configuration of a hardware switch. For example, it is possible to have a coated surface of the hardware switch, make a thin SW unit, have a hole on the SW unit, or have a metal portion on the SW unit.

Of the various types of processing explained in the description of the exemplary embodiments, it is acceptable to manually perform a part or all of the processing that is explained to be performed automatically (e.g., a process of supplying electric current). Conversely, it is acceptable to automatically perform, using a publicly-known technique, a part or all of the processing that is explained to be performed manually. In addition, the processing procedures, the controlling procedures, the specific names, and the information including various types of data and parameters that are presented in the text and the drawings can be modified in any form, except when it is noted otherwise.

The constituent elements of the apparatuses shown in the drawings are based on functional concepts. The constituent elements do not necessarily have to be physically arranged in the way shown in the drawings. In other words, the specific mode in which the constituent elements are distributed and integrated is not limited to the ones shown in the drawing. A part or all of the apparatuses can be distributed or integrated (e.g., the pulse-signal supplying unit and the control unit are integrated), either functionally or physically in any arbitrary units according to various loads and use condition. A part or all of the processing functions offered by the constituent elements can be realized by a CPU and a program analyzed and executed by the CPU, or may be realized as hardware with wired logic.

The operation procedure according to the embodiments (e.g., the in-vehicle system) can be realized by executing a predetermined program by a computer such as a personal computer or a workstation. The program can be stored in such a computer readable recording medium as a hard disk, a flexible disk (FD), compact disk read only memory (CD-ROM), a magneto optical disk (MO), and a digital versatile disk (DVD); and can be read by a computer for performing the operation procedure. For example, it is possible to distributing a CD-ROM containing the display control program described in the first embodiment (can be a separated CD-ROM for each unit) to cause a computer to load and execute the program stored in the CD-ROM.

According to an aspect of the present invention, the in-vehicle system includes a touch panel, supplies pulse signals having different timings to operators who have access to the touch panel, identifies an operator who has operated the touch panel, performs a control depending on an operation performed by a identified operator, detects a supplied pulse signal when the operator performs an operation, and identifies the operation based on the timing of a detected pulse signal. Therefore, it is possible to decrease noise at minimum to electric current to be supplied. As a result, it is possible to accurately identify an operator.

For example, assume that the pulse signals are supplied to a driver seat and a passenger seat with an interval of 0.2 second between the pulse signals when a car navigation system is used as an in-vehicle device. It is possible to distinguish an operation by a person in a driver seat from an operation by a person in a passenger seat based on detected timings of the pulse signals. Therefore, it is possible to decrease noise at minimum. As a result, an operator can be accurately identified.

Furthermore, according to another aspect of the present invention, when an operator operates a hardware switch, the pulse signal that has been supplied to the operator is detected via the hardware switch to identify the operator based on the timing of a detected pulse signal. Therefore, even when the hardware switch is arranged, an operator can be accurately identified by the hardware switch instead of the touch panel.

For example, assume that a hardware switch for activating the car navigation system and a hardware switch for activating a television are the same when a car navigation system is used as an in-vehicle device. It is possible to accurately identify an operator even with the hardware switch, and to execute an operation depending on the operator, e.g., activating the car navigation system when an operation is performed by a driver and activating the television when an operation is performed by a passenger. Furthermore, hardware switches having different functions can be integrated to one hardware switch. Therefore, it is possible to decrease the number of switches, otherwise the number of switches increases as the number of the in-vehicle units increases.

Moreover, according to still another aspect of the present invention, electrical property of an operator is detected based on the pulse signal that has been detected, and the pulse signal to be supplied to the operator is adjusted based on the detected electrical property. Therefore, it is possible to adjust the pulse width and pulse height depending on each operator. As a result, it is possible to accurately identify an operator.

For example, the pulse signal can be adjusted in various methods, e.g., the pulse width is widened or narrowed depending on whether an operator easily conducts electricity, or pulse height is increased or decreased. Therefore, it is possible to accurately identify an operator.

Furthermore, according to still another aspect of the present invention, when an operator operates the input unit, the pulse signals that have been supplied to the operator are sampled for a plurality of times via the input unit to identify an operator based on a sampling result. Therefore, it is possible to identify an operator in consideration with noise to electric current to be supplied to the operator. As a result, an erroneous operation can be prevented, and an operator can be accurately identified.

For example, when sampled pulse signals contain a pulse signal at the timing of being supplied to a driver seat, a pulse signal at a timing of being supplied to a passenger seat, a signal indicating that a driver and a passenger perform operation or the pulse signals are overlapped, and a pulse signal at timing other than the above timings due to noise, an operator can be identified based on an arbitral condition. Therefore, an erroneous operation can be prevented, and an operator can be accurately identified.

Moreover, according to still another aspect of the present invention, electrical property of an operator is detected based on the pulse signal detected via the input unit, and at least one sensitivity of the input unit and the operator identifying unit. Therefore, it is possible to detect the pulse signal with the most optimal receiving sensitivity depending on an operator. As a result, it is possible to prevent an erroneous identification of an operator.

For example, if the pulse signal via a large person and the pulse signal via a small person are detected at the same sensitivity, the pulse signal from the large person is less easy to be detected than that from the small person. In this case, an erroneous detection may occur, e.g., the pulse signal via the large person is missed. With the present invention, for detecting a large person, a sensitivity of at least one of the input unit and the operator unit is increased compared to that for the small person. Therefore, it is possible to detect the pulse signal from the large person at the same level of detecting the pulse signal from the small person. As a result, it is possible to prevent an erroneous identification of an operator.

Furthermore, according to still another aspect of the present invention, when an operator operates the input unit, the operation signal indicating that the input unit is operated by the operator is detected in addition to the pulse signal via the operator. The timings of detecting the pulse signal and the timing of detecting the operation signal are compared with each other. When the timings are different from each other, the level of the pulse signal to be supplied to the operator is adjusted so that the timings correspond to each other. Therefore, it is possible to maintain the most optimal detection level for detecting a pulse signal. AS a result, it is possible to prevent an erroneous detection of the pulse signal.

For example, when the timing of detecting the pulse signal is shorter than the timing of detecting the operation signal, the level of the pulse signal to be supplied to the operator is adjusted to be larger so that the timings correspond to each other. When the timing of detecting the pulse signal is longer than the timing of detecting the operation signal, the level of the pulse signal to be supplied to the operator is adjusted to be smaller so that the timings correspond to each other. Therefore, it is possible to maintain the most optimal detection level for detecting a pulse signal.

Moreover, according to still another aspect of the present invention, when an operator operates the input unit, the operation signal indicating that the input unit is operated by the operator is detected in addition to the pulse signal via the operator. At least one of a detection threshold of the pulse signal detected via the operator or the level of the pulse signal to be supplied to the operator is adjusted based on the level of the pulse signal via the operator within a timing in which the operation signal is detected. Therefore, it is possible to detect the pulse signal by using the most optimal level and the detection threshold. As a result, it is possible to maintain the most optimal detection level for detecting a pulse signal.

For example, when the timing of detecting the pulse signal is sufficient for detecting in the timing of detecting the operation signal, and the time margin for the detection is small, the in-vehicle system decreases the detection threshold to adjust the level of the pulse signal to be output to the seat sensor, so that the timing of detecting the pulse signal and the timing of detecting the operation signal have the same detection wave. When the time margin for the detection is long, and the timing of detecting the pulse signal is not sufficient for the timing of detecting the operation signal, the in-vehicle system increases the detection threshold, to adjust the level of the pulse signal to be output to the seat sensor to increase the level, so that the timing of detecting the pulse signal and the timing of detecting the operation signal have the same detection wave.

Furthermore, according to still another aspect of the present invention, the pulse signals having different timings are supplied to the passengers to identify an operator. A control depending on a identified operator is performed when the operator has performed the operation, a supplied pulse signal is detected, and the operator is identified based on the timing of the detected pulse signal. Therefore, it is possible to prevent noise at minimum to electric current to be supplied to the operator. As a result, an operator can be accurately identified.

Moreover, according to still another aspect of the present invention, when it is identified that a passenger other than a driver has performed a driving operation, such an operation is not allowed. Therefore, it is possible to prevent the passenger from performing the driving operation.

For example, it is possible to prevent a passenger from performing a speed change operation, a parking break operation, a honker operation, an indicator operation, a wiper operation, and a defogger operation.

Furthermore, according to still another aspect of the present invention, the central management operation of the vehicle body equipment is allowed when it is identified that such an operation is performed by an authorized operator. Therefore, it is possible to prevent the central management operation of the vehicle body to be performed by an unauthorized operator.

For example, an authorized passenger can exclusively perform the central door lock operation for centrally controlling a plurality of door lock mechanisms, a central window control for centrally controlling opening/closing the windows, and a lock control operation for preventing a predetermined operation for opening/closing a door.

Moreover, according to still another aspect of the present invention, when an operation for an individual operation of the vehicle body equipment, which is individually allowed for each passenger, is performed, an operator of the operation is identified to determine to which seat the individual operation is performed. Therefore, it is possible to prevent an erroneous operation performed by other passengers, and decrease a size of interface by sharing the interface for each of the individual operations.

For example, it is possible to prevent an erroneous operation of an operation of controlling air conditioner insider the vehicle, an operation of changing a seat condition, a window opening/closing operation.

Furthermore, according to still another aspect of the present invention, it is possible to enable the operation that is prohibited to perform during a driving if the operation is input from a passenger other than a driver.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display system comprising:
an operating unit that includes a touch panel;
a seat sensor arranged for each of a plurality of seats;
a pulse-signal supplying unit that supplies a pulse signal with a different timing to the seat sensor;
an operator identifying unit that detects, when a first operator sit on any one of the seats operates the operating unit, the pulse signal supplied to the seat sensor by the pulse-signal supplying unit through the first operator and the operating unit, and identifies the first operator based on a timing of a detected pulse signal; and
an operation control unit that performs a control depending on an operation performed on the operating unit by a detected first operator.

2. The display system according to claim 1, wherein
the operating unit includes a hardware switch, and
when the first operator operates the hardware switch, the operator identifying unit detects the pulse signal supplied to the seat sensor by the pulse-signal supplying unit through the first operator and the hardware switch.

3. The display system according to claim 1, wherein
the pulse-signal supplying unit detects electrical property of the first operator based on the detected pulse signal, and
the display system further comprises an adjusting unit that adjusts a pulse signal to be supplied to the first operator based on detected electrical property.

4. The display system according to claim 1, wherein the operator identifying unit samples the detected pulse signal for a plurality of times, and identifies the first operator based on a result of sampling.

5. The display system according to claim 1, wherein the operator identifying unit detects electrical property of the first operator based on the detected pulse signal, and changes sensitivity of either one of the operating unit and the operator identifying unit based on detected electrical property.

6. The display system according to claim 1, wherein
the operator identifying unit detects an operation signal supplied from the operating unit in addition to the pulse signal, and
the pulse-signal supplying unit compares a first timing at which the pulse signal is detected by the operator identifying unit with a second timing at which the operation signal is detected by the operator identifying unit, and if the first timing is different from the second timing, adjusts a pulse signal to be supplied to the first operator in such a manner that the first timing matches with the second timing.

7. The display system according to claim 1, wherein the operator identifying unit detects an operation signal supplied from the operating unit in addition to the pulse signal, and adjusts at least one of a detection threshold of the pulse signal and a pulse signal to be supplied to the first operator based on a level of the pulse signal within a timing at which the operation signal is detected.

8. A method of identifying an operator who operates an operating unit including a touch panel, and performing a control depending on an operation performed by an identified operator, the method comprising:
supplying a pulse signal having unique timing to a seat sensor arranged for each of a plurality of seats;
detecting, when a first operator sit on any one of the seats operates the operating unit, the pulse signal supplied at the supplying through the first operator and the operating unit;
identifying the first operator based on a timing of a detected pulse signal; and
performing a control depending on an operation performed on the operating unit by a detected first operator.

9. An in-vehicle display system comprising:
an operating unit that includes a touch panel;
a seat sensor arranged for each of a first seat and a second seat;
a pulse-signal supplying unit that supplies a pulse signal with a different timing to the seat sensor;
an operator identifying unit that detects, when a first operator from among a plurality of operators sit on the first seat and the second seat operates the operating unit, the pulse signal supplied to the seat sensor by the pulse-signal supplying unit through the first operator and the operating unit, and identifies the first operator based on a timing of a detected pulse signal; and
an operation control unit that performs a control depending on an operation performed on the operating unit by a detected first operator.

10. An operation control system comprising:
a seat sensor arranged for each of a first seat and a second seat;
a pulse-signal supplying unit that supplies a pulse signal with a different timing to the seat sensor;
an operating unit that receives an operation from an operator of a vehicle;
an operator identifying unit that detects, when a first operator sit on either one of the first seat and the second seat operates the operating unit, the pulse signal supplied to the seat sensor by the pulse-signal supplying unit through the first operator and the operating unit, and identifies the first operator based on a timing of a detected pulse signal; and
an operation control unit that performs a control depending on an operation performed on the operating unit by a detected first operator.

11. The operation control system according to claim 10, wherein
an operation about driving of the vehicle is performed on the operation control unit, and
when the detected first operator is other than a driver, the operation control unit does not perform the control.

12. The operation control system according to claim 11, wherein the operation about driving of the vehicle is any one of a transmission operation, a parking break operation, a horn operation, a vehicle light operation, a wiper operation, and a defogger operation.

13. The operation control system according to claim 10, wherein
an operation about a central management of vehicle equipments is performed on the operation control unit, and
when the detected first operator is an authorized operator who has an authority for executing the central management of the vehicle equipments, the operation control performs the control.

14. The operation control system according to claim 13, wherein the central control is any one of a central door lock operation for controlling a plurality of door lock mechanisms, a central window control for controlling opening and closing of a plurality of windows, and a lock control operation for prohibiting an opening and closing operation of a predetermined door.

15. The operation control system according to claim 10, wherein
an operation about an individual operation of a vehicle equipment that is individually operable by an operator of each of the first seat and the second seat is performed on the operation control unit, and
the operation control performs a control for the individual operation by the detected first operator.

16. The operation control system according to claim 15, wherein the individual operation is any one of an air conditioning operation in the vehicle, a seat condition changing operation, and a window opening and closing operation.

17. The operation control system according to claim 10, wherein
the operation control unit receives a operation input which is prohibited in driving during a driving of the vehicle, and
when the detected first operator is other than a driver, the operation control unit performs a control for the operation input.

* * * * *